(12) United States Patent
Borngräber

(10) Patent No.: US 9,893,549 B2
(45) Date of Patent: Feb. 13, 2018

(54) FOREIGN OBJECT DETECTION

(71) Applicant: Nokia Technologies Oy, Espoo (FI)

(72) Inventor: Frank Borngräber, Weissenhorn (DE)

(73) Assignee: Nokia Technologies Oy, Espoo (FI)

( * ) Notice: Subject to any disclaimer, the term of this patent is extended or adjusted under 35 U.S.C. 154(b) by 309 days.

(21) Appl. No.: 14/436,999

(22) PCT Filed: Oct. 25, 2012

(86) PCT No.: PCT/IB2012/055885
§ 371 (c)(1),
(2) Date: Apr. 20, 2015

(87) PCT Pub. No.: WO2014/064489
PCT Pub. Date: May 1, 2014

(65) Prior Publication Data
US 2015/0288214 A1   Oct. 8, 2015

(51) Int. Cl.
*G06K 9/00* (2006.01)
*H02J 7/02* (2016.01)
(Continued)

(52) U.S. Cl.
CPC ............... *H02J 7/02* (2013.01); *G01D 5/24* (2013.01); *G01V 3/10* (2013.01); *G06F 3/044* (2013.01);
(Continued)

(58) Field of Classification Search
CPC ... H02J 7/02; H02J 5/005; H02J 7/025; G06T 7/70; G06T 1/0007; G06T 2207/10004;
(Continued)

(56) References Cited

U.S. PATENT DOCUMENTS 5,915,250 A * 6/1999 Jain .................. G06F 17/30256
6,486,835 B1 * 11/2002 Wakeham ............. H01Q 1/244
343/702
(Continued)

FOREIGN PATENT DOCUMENTS

EP       2043226 A2    4/2009
WO   2010136927 A2    12/2010
(Continued)

OTHER PUBLICATIONS

"System Description Wireless Power Transfer", Wireless Power Consortium, vol. 1, Version 1.1, Mar. 2012, 128 pages.
(Continued)

*Primary Examiner* — Jonathan S Lee
(74) *Attorney, Agent, or Firm* — Ditthavong & Steiner, P.C.

(57) ABSTRACT

It is inter alia disclosed to determining whether an object detected (160) based on at least one capacitance representative of at least one capacitance representative sensed by at least one capacitance sensing element (111, 112, 113) of an apparatus (100) corresponds to a predefined type of objects, the apparatus (100) further comprising a wireless charging unit (140), wherein the at least one capacitance sensing element (111, 112, 113) is at least partially placed in proximity to the wireless charging unit (140).

14 Claims, 9 Drawing Sheets

(51) Int. Cl.
    *G01V 3/10* (2006.01)
    *G01D 5/24* (2006.01)
    *G06F 3/044* (2006.01)
    *G06T 1/00* (2006.01)
    *G06T 7/70* (2017.01)
    *H02J 5/00* (2016.01)

(52) U.S. Cl.
    CPC .............. *G06T 1/0007* (2013.01); *G06T 7/70* (2017.01); *G06T 2207/10004* (2013.01); *G06T 2207/30* (2013.01); *H02J 5/005* (2013.01); *H02J 7/025* (2013.01)

(58) Field of Classification Search
    CPC ........ G06T 2207/30; G01D 5/24; G01V 3/10; G06F 3/044
    See application file for complete search history.

(56) References Cited

U.S. PATENT DOCUMENTS

| | | | | |
|---|---|---|---|---|
| 8,736,228 | B1* | 5/2014 | Freed | H02J 7/0044 320/107 |
| 2005/0206565 | A1 | 9/2005 | Osaka et al. | |
| 2008/0158174 | A1 | 7/2008 | Land et al. | |
| 2008/0211458 | A1 | 9/2008 | Lawther et al. | |
| 2008/0246723 | A1 | 10/2008 | Baumbach | |
| 2008/0258679 | A1 | 10/2008 | Manico et al. | |
| 2010/0084918 | A1 | 4/2010 | Fells et al. | |
| 2011/0009057 | A1* | 1/2011 | Saunamaki | H02J 7/025 455/41.1 |
| 2012/0044199 | A1 | 2/2012 | Karpin et al. | |
| 2012/0068536 | A1 | 3/2012 | Stevens et al. | |
| 2012/0091993 | A1 | 4/2012 | Uramoto et al. | |
| 2012/0246374 | A1* | 9/2012 | Fino | G06F 1/1632 710/303 |
| 2013/0162202 | A1* | 6/2013 | Wang | G06F 3/044 320/108 |
| 2013/0193771 | A1* | 8/2013 | Teggatz | H01F 38/14 307/104 |
| 2013/0203356 | A1* | 8/2013 | Kim | H04B 15/00 455/63.1 |
| 2013/0315038 | A1* | 11/2013 | Ferren | G06K 9/3266 367/197 |
| 2014/0111019 | A1* | 4/2014 | Roy | G01V 3/081 307/104 |
| 2014/0167704 | A1* | 6/2014 | Lafontaine | G01R 25/00 320/137 |
| 2014/0375255 | A1* | 12/2014 | Leabman | H02J 7/025 320/108 |
| 2015/0054458 | A1* | 2/2015 | Yoon | H02J 7/025 320/108 |
| 2015/0365138 | A1* | 12/2015 | Miller | H02J 5/005 307/104 |
| 2016/0028248 | A1* | 1/2016 | Asanuma | H02J 17/00 307/104 |
| 2016/0052404 | A1* | 2/2016 | Enomoto | B60L 11/182 320/108 |
| 2016/0336804 | A1* | 11/2016 | Son | H02J 7/0027 |
| 2017/0077764 | A1* | 3/2017 | Bell | H02J 7/025 |

FOREIGN PATENT DOCUMENTS

| | | | |
|---|---|---|---|
| WO | 2012/004092 A3 | 1/2012 | |
| WO | WO 2012004092 A2 * | 1/2012 | ............. H02J 5/005 |

OTHER PUBLICATIONS

Partial Supplementary European Search Report received for corresponding European Patent Application No. 12887079.7, dated Jun. 16, 2016, 5 pages.

Extended European Search Report received for corresponding European Patent Application No. 12887079.7, dated Sep. 5, 2016, 10 pages.

International Search Report and Written Opinion received for corresponding Patent Cooperation Treaty Application No. PCT/IB2012/055885, dated Jun. 17, 2013, 13 pages.

* cited by examiner

|   | 0 | 1 | 2 | 3 | 4 | 5 | 6 | 7 | 8 | 9 |
|---|---|---|---|---|---|---|---|---|---|---|
| a | -15 | -1 | 0 | 0 | 0 | 0 | 0 | 0 | 3 | 0 |
| b | 0 | -1 | 0 | -3 | 2 | 0 | 0 | 0 | 0 | 0 |
| c | 2 | 0 | 0 | 0 | 1 | 0 | 0 | 1 | -2 | 0 |
| d | 0 | 0 | 0 | 0 | 0 | -3 | 0 | 0 | 0 | 0 |
| e | 0 | -1 | 0 | 0 | 0 | 4 | 0 | -4 | 0 | 2 |
| f | 1 | 0 | 0 | 0 | -2 | -5 | 0 | 0 | -3 | 0 |
| g | 0 | 0 | 3 | 0 | 0 | 2 | 0 | 0 | 0 | 0 |
| h | 0 | -2 | 0 | 0 | 0 | 0 | 0 | 3 | 0 | 0 |
| i | 0 | 0 | 1 | 0 | 0 | 0 | 0 | 0 | 0 | 0 |
| k | 1 | 4 | 0 | 0 | 0 | -1 | 0 | -2 | -1 | 0 |
| l | 0 | 0 | -2 | 0 | 0 | -3 | 0 | 1 | 0 | 15 |

Fig.4c

| | 0 | 1 | 2 | 3 | 4 | 5 | 6 | 7 | 8 | 9 |
|---|---|---|---|---|---|---|---|---|---|---|
| a | -15 | -1 | 0 | 0 | 0 | 0 | 0 | 0 | 3 | 0 |
| b | 0 | -1 | 0 | 5 | 5 | 0 | 0 | 0 | 0 | 0 |
| c | 2 | 0 | 7 | 11 | 12 | 10 | 7 | 1 | -2 | 0 |
| d | 0 | 3 | 10 | 0 | 0 | 7 | 14 | 5 | 0 | 0 |
| e | 0 | 7 | 10 | 0 | 0 | 4 | 5 | 10 | 5 | 2 |
| f | 3 | 10 | 5 | 0 | -2 | -5 | 3 | 16 | 4 | 0 |
| g | 4 | 12 | 4 | 0 | 0 | 2 | 4 | 10 | 3 | 0 |
| h | 3 | 10 | 7 | 0 | 0 | 0 | 6 | 10 | 4 | 0 |
| i | 0 | 5 | 10 | 6 | 3 | 5 | 10 | 6 | 3 | 0 |
| k | 1 | 4 | 6 | 11 | 12 | 10 | 5 | 3 | -1 | 0 |
| l | 0 | 0 | -2 | 3 | 4 | 5 | 0 | 1 | 0 | 15 |

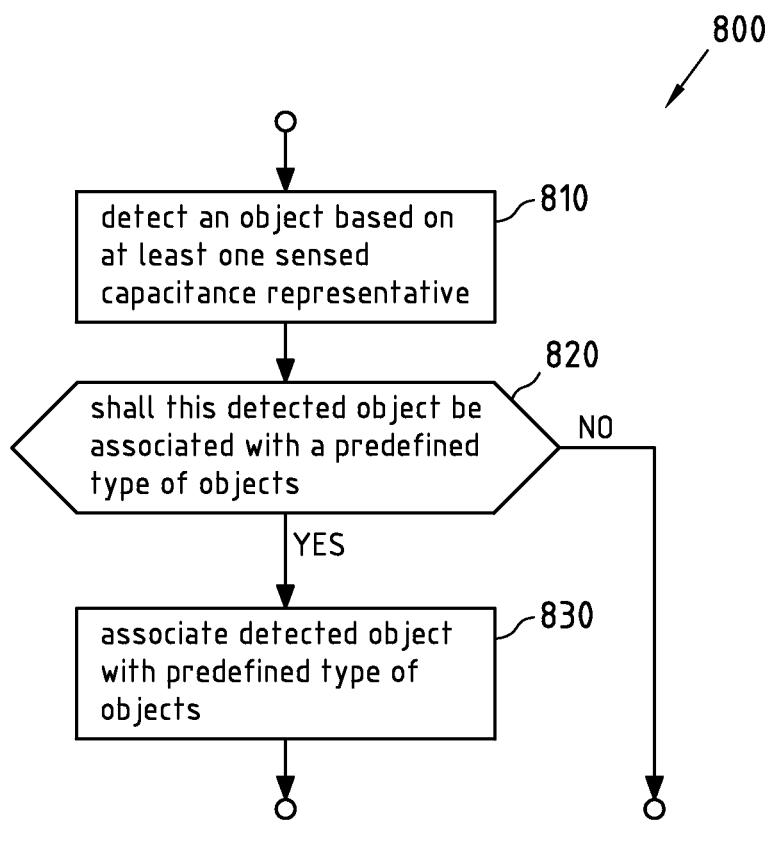

FOREIGN OBJECT DETECTION

FIELD

Embodiments of this invention relate to apparatuses comprising a wireless charging unit.

BACKGROUND

One of the biggest challenges in inductive based wireless energy transfer systems is how to handle and deal with the heat generated by eddy currents in so called Foreign Objects (FO) while an energy transfer link is operating from a wireless energy source to an energy sink.

There are different ways to handle heat generation in Foreign Objects (FO), starting from avoiding heat generation including Foreign Object Detection (FOD) up to active cooling.

For instance, a power loss detection method may be utilized for regulating the transmitted power of a transmitter coil of a wireless charger, wherein this power loss detection operates in normal use case. If a power loss is detected by this method the transmitted power may be reduced or switched off.

This power loss detection method may show the disadvantage that the transmit power may be regulated to a high value such that energy is emitted from the wireless charger although no receiving coil is in range, but an FO is present. Thus, the transmitter coil may still be running in open loop and emitting energy and create heat in the FO.

SUMMARY OF SOME EMBODIMENTS OF THE INVENTION

Thus, improving detection of foreign objects near to wireless charger may be desirable.

According to a first exemplary embodiment of a first aspect of the invention, an apparatus is disclosed, the apparatus comprising a wireless charging unit, at least one capacitance sensing element at least partially placed in proximity to the wireless charging unit, wherein each capacitance sensing element is configured to sense a capacitance representative, and a detection unit configured to determine whether an object detected based on at least one capacitance representative sensed by at least one capacitance sensing element of said at least one capacitance sensing element corresponds to a predefined type of objects.

According to a second exemplary embodiment of a first aspect of the invention, a method is disclosed, the method comprising determining whether an object detected based on at least one capacitance representative of at least one capacitance representative sensed by at least one capacitance sensing element of said apparatus corresponds to a predefined type of objects, the apparatus further comprising a wireless charging unit, wherein the at least one capacitance sensing element is at least partially placed in proximity to the wireless charging unit.

According to a third exemplary embodiment of a first aspect of the invention, an apparatus is disclosed, which is configured to perform the method according to the first aspect of the invention, or which comprises means for wireless charging, at least one capacitance sensing means at least partially placed in proximity to the means for wireless charging, wherein each capacitance sensing means is configured to sense a capacitance representative, and detection means for determining whether an object detected based on at least one capacitance representative sensed by at least one capacitance sensing element of said at least one capacitance sensing element corresponds to a predefined type of objects.

According to a fourth exemplary embodiment of a first aspect of the invention, an apparatus is disclosed, comprising at least one processor and at least one memory including computer program code, the at least one memory and the computer program code configured to, with the at least one processor, cause the apparatus at least to perform the method according to the first aspect of the invention. The computer program code included in the memory may for instance at least partially represent software and/or firmware for the processor. Non-limiting examples of the memory are a Random-Access Memory (RAM) or a Read-Only Memory (ROM) that is accessible by the processor.

According to a fifth exemplary embodiment of a first aspect of the invention, a computer program is disclosed, comprising program code for performing the method according to the first aspect of the invention when the computer program is executed on a processor. The computer program may for instance be distributable via a network, such as for instance the Internet. The computer program may for instance be storable or encodable in a computer-readable medium. The computer program may for instance at least partially represent software and/or firmware of the processor.

According to a sixth exemplary embodiment of an aspect of the invention, a computer-readable medium is disclosed, having a computer program according to a first aspect of the invention stored thereon. The computer-readable medium may for instance be embodied as an electric, magnetic, electro-magnetic, optic or other storage medium, and may either be a removable medium or a medium that is fixedly installed in an apparatus or device. Non-limiting examples of such a computer-readable medium are a RAM or ROM. The computer-readable medium may for instance be a tangible medium, for instance a tangible storage medium. A computer-readable medium is understood to be readable by a computer, such as for instance a processor.

In the following, features and embodiments pertaining to all of these above-described aspects of the invention will be briefly summarized.

The apparatus comprises at least one capacitance sensing element. As an example, the at least one capacitance sensing element may be considered as a capacitance sensing structure.

For instance, a capacitance sensing element of the at least one capacitance sensing element is configured to sense a capacitance representative, wherein, as an example, this capacitance representative may represent a capacitance or a change of a capacitance with respect to a reference capacitance.

Thus, as an example, at least one capacitance representative may be sensed by at least one capacitance sensing element, wherein each capacitance sensing element may be configured to sense a capacitance representative of the at least one capacitance representative.

Furthermore, for instance, a capacitance sensing element of the at least one capacitance sensing element may be configured to output a signal being indicative of the sensed capacitance representative, wherein this signal being indicative of the sensed capacitance representative might for instance be a signal being indicate of the sensed capacitance and/or indicative of a change of the sensed capacitance, wherein a capacitance sensing element might comprise a signal line for outputting this signal being indicative of the sensed capacitance representative. For instance, an input the detection unit of the apparatus may be connected to each capacitance sensing element of the at least one capacitance sensing element via at least one signal line in order to receive the signal being indicative of the sensed capacitance representative. As an example, a capacitance sensing element of the at least one capacitance sensing element may comprise or may represent a capacitor.

Furthermore, the apparatus comprises a wireless charging unit. This wireless charging unit may be configured to perform a wireless energy transfer via an electromagnetic field. For instance, the wireless charging unit may comprise at least one transmitting coil configured to provide electromagnetic energy via an electromagnetic field generated by said at least one transmitting coil, and/or, the wireless charging unit may comprise at least one receiving coil configured to receive electromagnetic energy via an electromagnetic field generated from a further apparatus, wherein this further apparatus may represent a wireless charger comprising at least one transmitting coil. For instance, as an example the wireless charging unit may be disposed under a surface of the apparatus. Thus, as an example, if a wireless charging should be performed, and if the wireless charging unit comprises at least one receiving coil configured to receive electromagnetic energy, the wireless charging unit of the apparatus may be placed near to a wireless charger such that the wireless charging unit receives an electromagnetic wave emitted from said wireless charger, wherein, for instance, the surface may be placed near to the wireless charger. Of, as an example, if the wireless charging unit comprises at least one transmitting coil configured to provide electromagnetic energy, i.e., the apparatus may comprise a part of a wireless charger or may represent a wireless charger, the wireless charging unit of the apparatus may be placed near to a further apparatus to be wirelessly charged such that an electromagnetic wave emitted from said wireless charging unit may be received by at least one receiving coil of said further apparatus, wherein, for instance, the surface may be placed near to the further apparatus.

The at least one capacitance sensing element is at least partially placed in proximity to the wireless charging unit. As an example, this placing of the at least one capacitance sensing element may be performed in a way that a metallic object located in a predefined area in an environment of the apparatus might be detected by or based on at least one of the at least one capacitance sensing element, e.g. by means of a deviation of a capacitance value sensed by each of this at least one capacitance sensing element of the at least one sensing element. For instance, said predefined area is located at least partially in the electromagnetic field of a wireless energy transfer when the wireless charging unit is used for transmitting power or used for receiving power. Thus, as an example, this predefined area may be in an environment of the surface located at least partially in proximity to the wireless charging unit, wherein the environment is at least partially located outside the apparatus such that object outside the apparatus located in said predefined area might be detected based on at least one capacitance sensing element of the at least one capacitance sensing element. Thus, for instance, the predefined region might be considered as a detection region in which objects might be detected based on at least one of the least one capacitance sensing element.

Accordingly, for instance, at least one of the at least one capacitance sensing element may be placed on a position with respect to the wireless charging unit in which an object might be detected by or based on the at least one of the at least one capacitance sensing element if said object is located on a position in which it might influence a wireless energy transfer when the wireless charging unit is used for the wireless energy transfer, i.e., this position might represent a position in which the object might influence the electromagnetic field of the wireless energy transfer.

For instance, during sensing a capacitance by at least one of the at least one capacitance sensing element, the wireless charging unit might be deactivated, wherein this deactivating might for instance comprise deactivating a transmitting coil of the wireless charging unit such that no electromagnetic field is generated by the wireless charging unit during sensing the capacitance by at least one of the at least one capacitance sensing elements. And/or, as an example, if said wireless charging unit comprises a receiving coil, a control signal might be transmitted to a further wireless charger in order to indicate the further wireless charger to deactivate its transmitting coil in order to avoid influences of a electromagnetic field generated by the further wireless charger on at least one of the at least one of the at least one capacitance sensing elements.

Then, it may be determined whether an object detected based on at least one capacitance representative of the at least one capacitance representative sensed by the at least one capacitance sensing element corresponds to a predefined type of objects.

For instance, an object might be detected based on the change of a sensed capacitance representative sensed by at least one capacitance sensing element compared to a sensed capacitance representative when no object is placed in the predefined region. As an example, if an object at least partially comprises metal and/or at least partially comprises magnetic material, the capacitance of at least on capacitance sensing element of the at least one capacitance sensing element may change when this object is placed near to this at least one capacitance sensing element, i.e., for instance, when the object is located in a distance to at least one of the at least one capacitance sensing element in which it may influences the capacitance of at least one of the at least one capacitance sensing element, and the respective capacitance element may output a signal being indicate of the change capacitance representative. Accordingly, as an example, based on a sensed capacitance representative sensed by at least one capacitance sensing element an object might be detected when this object might be placed in the predefined region. For instance, this example of detecting an object based on at least one sensed capacitance might be performed by means of the detection unit of the apparatus. As an example, this detection unit might comprise logic for controlling the at least one capacitance sensing element and for reading a signal being indicative of the capacitance representative from each of the capacitance sensing elements, wherein this signal might for instance be indicate of the capacitance and/or being indicative of a change of the capacitance from each of the capacitance sensing elements.

Furthermore, it is checked whether an object detected based on at least one capacitance representative of the at least one capacitance representative sensed by the at least one capacitance sensing element corresponds to a predefined type of objects. For instance, said predefined type of objects may be associated or may define foreign objects which would interfere a wireless charging performed by the wireless charging unit when at least partially placed in the electromagnetic field. As an example, if such a foreign object is placed at least partially in the electromagnetic field this foreign object may act as an additional load and heat may be generated at such a foreign object caused by eddy currents induced in this foreign. This may particularly hold for foreign objects comprising metals. This generation of heat at a foreign object might cause problems and, further, efficiency of wireless charging may be decreased since a part of the energy transmitted via the electromagnetic field is used for heating the foreign object. Accordingly, it may be desirable to detect such a foreign object which would interfere the wireless charging in order to avoid that heat is generated at foreign objects based on a wireless charging process and/or that efficiency of wireless charging may be decreased due to a foreign object influencing the electromagnetic field.

Thus, as an example, said predefined type of objects may be associated or may define at least one foreign object which can be detected based on at least one sensed capacitance representative, e.g. based a capacitance and/or based on a change of capacitance sensed by at least one capacitance sensing element of the at least one capacitance sensing element.

For instance, a foreign object of said at least one foreign object of said predefined type of objects might be associated with a matching rule, wherein this matching rule may comprise at least one predefined capacitance value and/or at least one predefined change of a capacitance value, wherein each of this at least one predefined capacitance value and/or at least one predefined change of a capacitance value is associated with a different capacitance sensing element of the at least one capacitance sensing element. Then, as an example, it may be determined for an foreign object of said at least one foreign object of said predefined type of objects whether the respective matching rule is fulfilled with respect to at least one sensed capacitance value representative, wherein this checking whether the respective matching rule is fulfilled may comprise determining whether at least one predefined capacitance value and/or at least one predefined change of a capacitance value associated with the respective foreign object at least partially (or approximately or exactly) matches with the corresponding sensed at least one capacitance value and/or the corresponding sensed at least one change of a capacitance value sensed the at least one capacitance sensing element associated with the respective foreign object, and if such a match is determined, it is determined in step that the detected object corresponds to the respective foreign object associated or defined by the predefined type of objects. For instance, said at least partially matching or approximately matching may lead to a positive matching results if a sensed value does not differ more than 10% or not more than 5% of the respective predefined value (e.g., capacitance value or change of capacitance value) of the respective matching rule.

Or, as an example, the matching associated with a foreign object of said at least one foreign object of said predefined type of objects might comprise at least one predefined range of capacitance values and/or at least one predefined range of changes of a capacitance value, wherein each of this at least one predefined capacitance value and/or at least one predefined change of a capacitance value is associated with a different capacitance sensing element of the at least one capacitance sensing element. Then, as an example, it may be determined for an foreign object of said at least one foreign object of said predefined type of objects whether the respective matching rule is fulfilled with respect to at least one sensed capacitance value representative, wherein this checking whether the respective matching rule is fulfilled may comprise determining whether at least one predefined range of capacitance values and/or at least one predefined range of changes of a capacitance value associated with the respective foreign object at least partially (or approximately or exactly) matches with the corresponding sensed at least one capacitance value and/or the corresponding sensed at least one change of a capacitance value sensed the at least one capacitance sensing element associated with the respective foreign object, and if such a match is determined, it my be determined that the detected object corresponds to the respective foreign object associated or defined by the predefined type of objects. For instance, said at least partially matching or approximately matching may lead to a positive matching results if a sensed value does not differ more than 10% or not more than 5% of the respective predefined range of values (e.g., range of capacitance values or range of changes of capacitance value), if an exact match is desired, if a sensed value is within the respective predefined range of values.

It has to be understood that other ways of determining whether an foreign object associated with the predefined type of objects based on at least one sensed capacitance representative sensed by at least one of the at least one capacitance sensing element may be performed in step, and, thus, for instance, other matching rules may be used for determining whether a detected object corresponds to the predefined type of objects.

For instance, when determining whether a detected object corresponds to the predefined type of objects it may be determined for at least one foreign object of the at least one foreign object associated with the predefined type of objects whether the respective foreign object matches with a detected object based on at least one sensed capacitance representative sensed by at least one of the at least one capacitance sensing element and based on the matching rule associated with the respective foreign object, and if the at least one sensed capacitance representative sensed by at least one of the at least one capacitance sensing element indicates that the detected object represents a respective foreign object of the predefined type of objects in accordance with the matching rule, it may be determined that the detected object represents an object that corresponds to the predefined type of objects. Otherwise, as an example, if the at least one sensed capacitance representative sensed by at least one of the at least one capacitance sensing element does not lead to a successful match with a foreign object associated with the predefined type of object, it may be determined that the detected object does not correspond to the predefined type of objects.

Furthermore, as an example, when determining whether the detected object corresponds to the predefined type of object, the detection unit may be configured to distinguish between an object which matches with one foreign object of the at least one foreign object associated with the predefined type of object and an object which corresponds to an allowable further apparatus configured to perform wireless charging which can be used to perform wireless charging in conjunction with the wireless charging unit of apparatus, wherein said further wireless apparatus configured to perform wireless charging may represent a wireless charger and wherein said wireless charging unit may comprise at least one receiving coil configured to receive energy from said wireless charger, and/or wherein said further wireless apparatus configured to perform wireless charging may comprise at least one receiving coil configured to receive wireless energy and wherein said wireless charging unit may comprise at least one transmitting coil configured to provide wireless energy.

For instance, a second predefined type of objects may be associated with at least one wireless charge object and/or at least one object not influencing wireless charging, wherein a wireless charge object of the said at least one wireless charge object may represent the above mentioned wireless apparatus configured to perform wireless charging, e.g. a wireless charger or a wireless apparatus comprising at least one receiving coil configured to receive wireless energy.

For instance, a wireless charge object of the at least one wireless charge object and/or an object not influencing wireless charging of the second predefined type of objects might be associated with a matching rule, wherein this matching rule may comprise at least one predefined capacitance value and/or at least one predefined change of a capacitance value, wherein each of this at least one predefined capacitance value and/or at least one predefined change of a capacitance value is associated with a different capacitance sensing element of the at least one capacitance sensing element, and/or this matching rule may comprise at least one predefined range of capacitance values and/or at least one predefined range of changes of a capacitance value, wherein each of this at least one predefined capacitance value and/or at least one predefined change of a capacitance value is associated with a different capacitance sensing element of the at least one capacitance sensing element, wherein a match of a detected object can determined as described with respect to determining a match of a detected object with a foreign object based on matching rule associated with the foreign object.

Thus, as an example, when determining whether a detected object corresponds to the predefined type of objects, the detector may be configured to determine whether a detected object matches with a wireless charge object of the at least one wireless charge object associated with the second predefined type of objects based on at least one capacitance representative of the at least one sensed capacitance representative and based on the matching rule associated with the respective wireless charge object, and if no match is determined with respect to each wireless charge object of the at least one wireless charge object of the second predefined type of objects it may be determined that the detected object is associated with the predefined type of objects, since the detected object does not represent a wireless charge object and thus may be assumed to represent a foreign object.

For instance, said matching rules associated with a foreign object or said matching rules associated with a wireless charge object (or an object not influencing wireless charging) may be determined based on a training with known objects, wherein a known object may placed in the predefined region, at least one capacitance representative may be sensed, and wherein a matching rule for this known object may be determined based on at least one capacitance representative of the sensed at least one capacitance representative is determined.

For instance, the apparatus may be implemented as a module and may for instance be part of a stationary or mobile apparatus, wherein the mobile apparatus may represent a mobile computer like a mobile pad, netbook or notebook which might comprise a mobile wireless phone functionality, or a mobile phone or a smartphone. For instance, said mobile phone or smartphone may represent a mobile phone in accordance with the 3rd Generation Partnership Project (3GPP).

According to an exemplary embodiment of the first aspect of the invention, said at least one capacitance sensing element represent a plurality of capacitance sensing elements.

For instance, said plurality of capacitance sensing elements may form or be part of a capacitance sensing structure. As an example, the plurality of capacitance sensing elements may be substantially or exactly arranged in plane.

Furthermore, as an example, at least one capacitance sensing elements of the plurality of capacitance sensing elements may further be configured to change the capacitance when touched. Thus, the capacitance sensing structure may be used as a kind of touchpad and may, for instance, serve as a kind of user interface for receiving a user input.

For instance, the plurality of capacitance sensing elements may be arranged in form of a matrix, wherein the capacitance sensing elements may be arranged in columns and rows, but it has to be understood that the plurality of capacitance sensing elements may be arranged in any well-suited arrangement.

As an example, the plurality of capacitance sensing elements may be configured to be used for capturing an image of an object disposed on the plurality of capacitance sensing elements, wherein a respective capacitance representative sensed by a respective capacitance sensing element of the plurality of capacitance sensing elements may represent or may be used for determining an image element of the image. Thus, as an example, the image may comprise a plurality of image elements and each image element of the plurality of image elements may be captured by or based on a different capacitance sensing element of the plurality of capacitance sensing elements. For instance, the detection unit might be configured to determine an image based on the plurality of sensed capacitance representatives. For instance, an image element may be indicative of the intensity of the sensed capacitance or may be indicative of the change of an intensity of the sensed capacitance of the respective capacitance sensing element associated with this image element.

According to an exemplary embodiment of the first aspect of the invention, said plurality of capacitance sensing elements are arranged in a matrix.

For instance, the capacitance sensing elements may be arranged in columns and rows.

As an example, the capacitance sensing structure may comprises a plurality of rows and a plurality of columns, where each cross section between a row and a column build a capacitor, and wherein each capacitor may be formed by a respective cross sectional part of a column and a row, wherein a dielectric medium may for instance be placed between the respective cross sectional part of a column and a row. For instance, the columns and rows may comprise Indium Tin Oxide and may for instance be made completely of ITO.

According to an exemplary embodiment of the first aspect of the invention, said plurality of capacitance sensing elements are arranged in a capacitance sensing layer of the apparatus.

For instance, the above-mentioned capacitance structure comprising the plurality of capacitance sensing elements may be formed as a layer.

According to an exemplary embodiment of the first aspect of the invention, said capacitance sensing layer is at least partially disposed on the wireless charging unit.

According to an exemplary embodiment of the first aspect of the invention, the apparatus comprising a touch sensitive interface, wherein said plurality of capacitance sensing elements are part of the touch sensitive interface.

As an example, the capacitance sensing elements of the capacitance sensing structure may further be configured to change their capacitance when touched. Thus, the capacitance sensing structure may be used a kind of touchpad and may serve as user interface configured to receive a user input. Accordingly, the capacitance sensing structure can be used as a touch sensitive interface, wherein said plurality of capacitance sensing elements are part of the touch sensitive interface. For instance, the detection unit might be configured to distinguish between tip on at least one capacitance sensing element indicated by a respective at least one capacitance representative and an object detected by at least one capacitance sensing element indicated by a respective at least one capacitance representative, e.g. since the change of the capacitance representative caused by a tip on the respective capacitance sensing element may be much higher than the change of the capacitance representative caused by an metallic or magnetic object placed in a sensing area of the respective capacitance sensing element.

According to an exemplary embodiment of the first aspect of the invention, said touch sensitive interface comprises a display functionality.

For instance, the display may be part of the capacitance sensing layer, or may be disposed on the capacitance sensing layer, or may be disposed below the capacitance sensing layer. Accordingly, as an example, the touch sensitive layer comprises the capacitance sensing layer and the display and thus the touch sensitive layer comprises a display functionality.

The display may for instance serve as a user interface configured to present graphics, e.g. black and white or coloured, to a user. For instance, the apparatus might be configured to provide an image captured based on the capacitance sensing structure to a user, which might be used for presenting a detected object which is determined to represent an object corresponding to the predefined type of objects, (e.g., a foreign object) to the user. Furthermore, the display might for instance be used for performing a training procedure in order to learn predefined objects being associated with the predefined type of objects, as will be explained with respect to the second aspect of the invention.

Furthermore, the display may be configured to provide other information to the user, e.g. information related to a potential further apparatus which is configured to perform wireless charging in conjunction with the wireless charging unit of the apparatus, and/or information of a state of charge of a rechargeable energy source of the apparatus, and/or information of transmitted power/energy with regard to a wireless charging procedure (e.g. over time), and/or received power/energy with regard to wireless charging procedure (e.g. over time).

According to an exemplary embodiment of the first aspect of the invention, the apparatus comprising a temperature sensing layer at least partially disposed on the capacitance sensing layer.

For instance, the temperature sensing layer might be configured to sense a temperature on at least one position of the temperature sensing layer. For instance, the temperature sensed on at least one position may be used to determine that an object is detected which corresponds to the predefined type of objects if a temperature sensed on at least one position of the at least one sensing position of the temperature sensing layer exceeds a predefined object.

According to an exemplary embodiment of the first aspect of the invention, the apparatus comprises a display layer at least partially arranged between the wireless charging unit and the capacitance sensing layer.

Thus, the capacitance sensing layer may be disposed at least partially on the displayer layer, wherein the capacitance sensing layer may be assumed to be transparent. For instance, the capacitance sensing layer and the display layer may represent a combined layer which comprises the plurality of capacitance sensing elements and the display layer. For instance, the display layer may be configured to visualize black and white, and/or graysscaled and/or coloured images.

According to an exemplary embodiment of the first aspect of the invention, information is provided via the display layer, wherein said information is at least one of: information associated with a wireless charging process, and information not associated with a wireless charging process.

For instance, said information associated with the wireless charging process may comprise status information regarding a wireless charging process, e.g. information on a power or energy flow. As an example, during a charging process, a battery symbol may be shown on the display, and/or the state of charge or energy transfer may indicated on the display (e.g. by means of different colours associated with different states of charge or energy transfer). Furthermore, it may be indicated on the display whether a detected object represents a foreign object or a wireless charge object, i.e., as an example, a type of interoperability might be depicted on the display. Furthermore, as an example, the coupling factor between the wireless charging unit and a wireless charging unit of a further apparatus might be shown on the display and/or a factor of efficiency of the wireless charging procedure might be shown on the display, and/or, it might be shown on the display whether a detected wireless charge object is operating according to the WPC standard or not.

Furthermore, for instance, said information not associated with the wireless charging process may comprise information associated with mobile phone or smartphone functionalities, e.g. short messages (SMS) or other messages received or to be transmitted via a mobile phone interface, or gadget effects presented to a user, or it may represent an image captured by the capacitance sensing layer, or it may comprise information on errors or sensor reports, or any other well-suited kind of information.

According to an exemplary embodiment of the first aspect of the invention, said information associated with the wireless charging process may comprise a directional information being indicative of an improved alignment of a detected object with respect to the apparatus for enhancing wireless energy transfer.

For instance, the apparatus (e.g., the detection unit) might be configured to determine a misalignment of a detected object which corresponds to a predefined type of object, wherein this predefined type of object represents said second predefined type of objects which is be associated with at least one wireless charge object. A misalignment might represent a misalignment between the wireless charging unit of the apparatus and the wireless charging unit of said wireless charge object which may lead to a decreased wireless energy transfer between the wireless charging unit of the apparatus and the wireless charging unit of said wireless charge object. Said misalignment might be detected based on the capacitance representatives sensed by the plurality of capacitance sensing elements. For instance, if it is detected that the wireless charge object is not placed in a predefined region above the wireless charging unit, wherein this predefined region enables good wireless energy transfer between the wireless charging unit and a wireless charge unit placed in this predefined region, this misplacement may be detected based on capacitance representatives sensed by capacitance sensing elements of the plurality of capacitance sensing elements, and the apparatus may be configured to determine a direction being indicative of a movement of the detected wireless charge object in order to decrease the misalignment based on said capacitance representatives. For instance, the apparatus may be configured to determine a position of the detected object with respect to the apparatus based on the capacitance representatives sensed by capacitance sensing elements of the plurality of capacitance sensing elements, to compare this detected position with an optimum or optimized position associated with optimal or optimized energy transfer between the wireless charging unit of the apparatus and a detected object, and, if said detected position does not represent said optimum or optimized position, to determine directional information being indicative of a better or optimized positioning of the detected object.

This directional information can be displayed on the display layer in order to show a user how to move the wireless charge object with respect to the apparatus in order to improve wireless energy transfer. As an example, this displayed directional information may represent an arrow indicating the direction or any other well-suited directional information.

According to an exemplary embodiment of the first aspect of the invention, an image based on at least one capacitance representative sensed by at least one capacitance representative of the plurality of capacitance sensing elements is captured, and said determining whether an object detected based on at least one sensed capacitance of said at least one sensed capacitance corresponds to a predefined type of object comprises: determining whether the captured image at least partially matches with an image of an object associated with the predefined type of objects.

For instance, this determining whether a detected object corresponds to the predefined type of objects based on a captured image may comprise comparing whether the captured image at least partially matches with an image of an object associated with the predefined type of objects. As, an example, for each object or at least one object of at least one object associated with the predefined type of objects a kind of reference image might be stored, and if there is a match detected between the captured image and a reference image of an object of the at least one object, it might be determined that the detected object represents an object that corresponds to a predefined type of object.

As an example, a match may be determined if the captured image at least partially corresponds to a reference image, or if a subpart of a captured image at least partially corresponds to a reference image. As an example, a correlation factor between the captured image and a reference image or a correlation factor of a subpart of the captured image and a reference image may be calculated, and if the correlation factor exceeds a predefined threshold, a match between the captured image and the reference image may be determined.

According to an exemplary embodiment of the first aspect of the invention, said determining whether an object detected based on at least one sensed capacitance of said at least one sensed capacitance corresponds to a predefined type of object comprises: determining a feature of the object based on at least one sensed capacitance representative, and determining whether the feature at least partially corresponds to a predefined feature of at least one predefined feature associated with said predefined type of objects.

Thus, a feature of an object is determined based on at least one capacitance representative. For instance, this may comprise capturing an image, the image comprising a plurality of image element, wherein a feature of an object is determined based on image elements of said plurality of image elements. For instance, said feature may represent any feature of the object which may be determined based on an image segmentation and which might be suitable to classify a detected object. As an example, this feature might represent a shape of the object, wherein shape may be understood to represent a geometric structure or form, e.g. a pattern or a profile of an object.

Then it is determined whether the determined feature at least partially corresponds to a predefined feature associated with the predefined type of objects. For instance, the predefined type of object may be associated with a list comprising at least one predefined feature, and if the determined feature at least partially corresponds to a predefined feature of said list, it might be determined that the detected object corresponds to the predefined type of objects.

For instance, a correlation value may be calculated between the determined feature and a predefined feature of the list, and if the correlation value exceeds a predefined threshold, it is determined that the determined feature at least partially corresponds to the respective predefined feature of the list.

As an example, if it is determined that the determined feature does not at least partially corresponds to a feature associated with the predefined type of object, e.g. if no calculated correlation value between the determined feature and each predefined feature of the list exceeds the predefined threshold, it may for instances determined that the detected object does not correspond to the predefined type of objects.

It has to be understood that other matching algorithms in order to check whether the determined feature does at least partially correspond to a predefined of the list than the above mentioned correlation value based algorithm may also be applied.

Accordingly, based an a feature of an object, wherein the feature is determined based on at least one sensed capacitance representative, a classification of the detected object may performed and due to the classification it may be determined whether this object corresponds to the predefined type of objects or not.

According to an exemplary embodiment of the first aspect of the invention, said feature represents a shape of the object.

As an example, the feature might represent a shape of the object, wherein shape may be understood to represent a geometric structure or form, e.g. a pattern or a profile of an object. For instance, if the feature represents a shape of the object this shape may be determined based on an edge detection which may be performed in a subpart of the captured image or the complete captured image. As an example, the edge detection may represent a detection algorithm which identifies image elements in the captured image at which the image element intensity may change sharply or may have discontinuities.

For instance, said detected shape may represent a new image comprising shape information, which might for instance be generated based on said edge detection, wherein this new image might be compared with a predefined image associated with the predefined type of objects. Thus, for instance, with respect to the above mentioned list comprising at least one predefined feature associated with the predefined type of objects, this list might comprise at least one predefined image comprising shape information, wherein each predefined image may be associated with a respective predefined object. Then, at step 520 it might be determined whether the new image comprising shape information at least partially corresponds to a predefined image comprising shape information in order to determine whether the determined feature (i.e., shape) at least partially corresponds to the a predefined feature associated with the predefined type of object. For instance, said example of calculating a correlation value may be used, wherein a correlation value between the new image or subpart of the new image and a predefined image of the list calculated and compared with the correlation threshold.

Furthermore, for instance, said determined shape may represent the type of the shape, e.g. circular, quadratic, elliptic, rectangular and/or any other well-suited shape, and, for instance, the determined shape may further comprise information on the size of the shape. Then, as an example, with respect to the above mentioned list comprising at least one predefined feature associated with the predefined type of objects, this list might comprise at least one type of shape, wherein each type of shape is associated with a respective predefined object. Then, it might be determined whether the determined type of shape at least partially corresponds to a predefined type of shape of the list in order to determine whether the determined feature (i.e., shape) at least partially corresponds to the a predefined feature associated with the predefined type of object. Furthermore, for instance, said determining may further comprise comparing the information on the size of the shape with a size associated with the respective predefined object of the list, and, for instance, if the size of the determined shape is less than size threshold, wherein the size threshold may depend on the size associated with the respective predefined object, it may determined that the determined object does not match with the respective predefined object, even if the determined type of shape at least partially corresponds to the type of shape associated with this predefined object.

According to an exemplary embodiment of the first aspect of the invention, said shape of the object is determined based on an edge detection.

As an example, the edge detection algorithm for determining the shape may be based or may represent one of: a Sobel-Operator, a Scharr-Operator, a Laplace-Filter, a Prewitt-Operator, a Roberts-Operator, a Kirsch-Operator, a Canny-Algoritmus, and Marr-Hildreth-Operator.

According to an exemplary embodiment of the first aspect of the invention, said determining whether the shape at least partially corresponds to a predefined shape associated with said predefined type of object comprises: calculating for at least one predefined feature of the at least one predefined feature associated with said predefined type of objects a correlation value being indicate of a correlation between the respective predefined feature and the determined feature, and determining whether a correlation value exceeds a predefined correlation value.

Thus, for instance, a correlation value may be calculated between the determined feature and a predefined feature of the list, and if the correlation value exceeds a predefined threshold, it may determined that the determined feature at least partially corresponds to the respective predefined feature of the list, otherwise it may for instance be determined that the determined feature does not correspond to the respective predefine feature of the list. For instance, the predefined correlation value may represent a correlation value threshold.

As an example, said calculating for at least one predefined feature of the at least one predefined feature associated with said predefined type of objects a correlation value being indicate of a correlation between the respective predefined feature and the determined feature, and determining whether a correlation value exceeds a predefined correlation value may for instance be performed until a correlation value exceeds a predefined correlation value or until a correlation value has been calculated and is has been determined for each correlation value whether the correlation value exceeds a predefined correlation for each of the at least one predefined feature associated with said predefined type objects associated with the predefined type of objects.

According to an exemplary embodiment of the first aspect of the invention, the apparatus comprises at least one temperature sensor, and wherein said determining whether an object corresponds to the predefined type of objects is further based on a temperature measured by said at least one temperature sensor.

As an example, the capacitance sensing structure might further be configured to detect thermal deviations in the surface, e.g. caused by local hot spots. For instance, at least one capacitance sensing element of the at least one capacitance sensing element may comprise a dielectric medium which changes the permittivity over temperature. Thus, the capacitance representative of such a capacitance sensing element comprising this dielectric medium may comprise information on the temperature.

Or, as another example, the apparatus may comprise a temperature sensing layer configured to sense a temperature on at least one position of the temperature sensing layer. For instance, the temperature sensed at least one position may be used to determine that an object is detected which corresponds to the predefined type of objects if a temperature sensed at least one position of the at least one sensing position of the temperature sensing layer exceeds a predefined object. For instance, said temperature sensing layer may be disposed at least partially on the at least one capacitance sensing element.

For instance, temperature information may be used to determine that an object detected based on at least one capacitance representative corresponds to the predefined object if a temperature sensed by at least one capacitance sensing element exceeds a predefined temperature threshold.

According to an exemplary embodiment of the first aspect of the invention, it is disclosed to deactivate the wireless charging unit during sensing the at least one capacitance representative and activating the wireless charging unit when said detected object does not represent an object of the predefined type of object.

For instance, due to deactivating the wireless charging unit no wireless charging is performed. Accordingly, no electromagnetic field used by a wireless charging process may interfere with at least one of the at least one capacitance sensing element.

Then it may be checked whether there is an object which corresponds to the predefined type of objects based on at least one capacitance representative sensed by at least one capacitance sensing element of the at least one capacitance sensing element.

For instance, this checking whether there is an object which corresponds to the predefined type of objects may comprise or may be part of determining whether an object detected based on at least one capacitance representative corresponds to a predefined type of objects as mentioned above.

If there is an object which corresponds to the predefined type of object, it may be assumed that this object represents a foreign object and the method may decide not to perform charging. Otherwise, as an example, if the checking leads to the result that there is no object which corresponds to the predefined type of objects, the method may proceed with performing a wireless charging. For instance, this performing wireless charging may comprise activating the wireless charging unit.

Accordingly, as an example, wireless charging can be avoided when there is a foreign object detected which might interfere with the electromagnetic field used for such a wireless charging process.

According to an exemplary embodiment of the first aspect of the invention, the method comprises at least one of deactivating the wireless charging unit and activating the capacitance sensing layer in a first mode, activating the wireless charging unit and deactivating the capacitance sensing layer in a second mode, and activating the wireless charging unit and activating the capacitance sensing layer in a third mode.

Thus, for instance, the apparatus can be operated in the first mode, or in the second mode, or in the third mode. As an example, it has to be understood that there may be further modes for operating the apparatus.

Accordingly, if the apparatus is in the first mode, the wireless charging unit is deactivated and the apparatus is configured to determine whether an object detected based on at least one capacitance representative of the at least one capacitance representative sensed by the capacitance sensing layer corresponds to a predefined type of objects, as mentioned above.

Furthermore, in the second mode the wireless charging unit is activated in order to provide wireless power for charging by simultaneously deactivating the capacitance sensing layer.

In the third mode, for instance, it may be possible to perform a wireless charging and to determine whether an object detected based on at least one capacitance representative of the at least one capacitance representative sensed by the capacitance sensing layer corresponds to a predefined type of objects.

According to an exemplary embodiment of the first aspect of the invention, the apparatus comprises a temperature sensing layer at least partially disposed on the capacitance sensing layer, the method comprising at least one of: deactivating the temperature sensing layer in the first mode, activating the temperature sensing layer in the second mode, and activating the temperature sensing layer in the third mode.

Thus, in first mode, the temperature sensing layer may be deactivated, since the wireless charging unit is deactivated and thus no wireless energy is emitted and, consequently, a foreign object would not be heated due to the absence of an electromagnetic field.

Furthermore, in the second mode the temperature sensing layer may be activated and the method may comprise determining whether an detected object corresponds to a predefined type based on a temperature sensed by the temperature sensing layer, wherein, for instance, it may be determined that an object corresponds to the predefined type of objects if a temperature sensed on at least one position of at least one sensing position of the temperature sensing layer exceeds a predefined threshold.

For instance, the temperature sensing layer may be configured to detect single or multiple hot spots, and based on the detected situation a wireless power transfer may be stopped. As an example, in the second mode there is no comparison with pre-defined shapes needed since the thermal sensing layer would just inform about the temperature level of the surface of the transmitter or receiver stack, wherein the transmitter or receiver stack comprises the wireless charging unit, the capacitance sensing layer and the temperature sensing layer at least partially disposed on the capacitance sensing layer.

As an example, the thermal sensing layer may be configured to be operated in a first state, wherein in this first state the thermal sensing layer is configured to scan thermal shapes. Furthermore, as an example, the thermal sensing layer may be configured to be operated in a second state, wherein in this second state the thermal sensing layer is configured to detect single and/or multiple hot spots on the thermal sensing layer. For instance, the thermal sensing layer may be configured to be operated in a third state, wherein in this third state the thermal sensing layer is configured to sense overall temperature distribution. Thus, for instance, the thermal sensing layer may be operated in the first state, in the second state or in the third state, wherein in each state thermal information is detected, and wherein in the first state the thermal information represents thermal shape, in the second state the thermal information represents the information about detected hot spots, e.g., whether there is a single hot spot or multiple hot spots (which may include the number of detected hot spots) and may further optionally comprise information regarding the position of the detected at least on hot spot, and wherein the third state the thermal information represents an overall temperature distribution. For instance, based on the detected thermal information, it may be decided whether to stop or not to stop wireless charging. This may be performed without performing a comparison whether a detected object corresponds to a pre-defined type of objects.

In the third mode, said determining whether an detected object corresponds to a predefined type of objects may further depend on a temperature sensed by the temperature sensing layer, wherein, for instance, it may be determined that an object corresponds to the predefined type of objects if a temperature sensed on at least one position of at least one sensing position of temperature sensing layer exceeds a predefined threshold.

According to an exemplary embodiment of the first aspect of the invention, the apparatus is operated in one of the first, second and third mode based on a status of a wireless energy transfer process associated with the wireless charging unit.

For instance, the apparatus may comprise a power transmission sequence controller and/or a transmitter controller which are configured to operate the apparatus in the first mode, the second mode or in the third mode depending on the situation and/or on information of the wireless energy transfer process associated with the wireless charging unit. Furthermore, it has to be understood that the apparatus it not limited to be operated in either of the first, second and third mode, but there may for instance be further modes for operating the apparatus.

Furthermore, as an example, the actual mode of operation might be shown on the optional display layer.

According to an exemplary embodiment of the first aspect of the invention, said wireless charging unit comprises at least one of: a wireless power transmitter, and a wireless power receiver.

The wireless charging unit is configured to perform a wireless energy transfer via an electromagnetic field. For instance, the wireless charging unit may represent a wireless power transmitter and may comprise at least one transmitting coil configured to provide electromagnetic energy via an electromagnetic field generated by said at least one transmitting coil, and/or, the wireless charging unit may comprise a wireless power receiver and may comprise at least one receiving coil configured to receive electromagnetic energy via an electromagnetic field generated from a further apparatus, wherein this further apparatus may represent a wireless charger comprising at least one transmitting coil. For instance, as an example the wireless charging unit may be disposed under a surface of the apparatus. Thus, as an example, if a wireless charging should be performed, and if the wireless charging unit comprises at least one receiving coil configured to receive electromagnetic energy, the wireless charging unit of the apparatus may be placed near to a wireless charger such that the wireless charging unit receives an electromagnetic wave emitted from said wireless charger, wherein, for instance, the surface may be placed near to the wireless charger. Of, as an example, if the wireless charging unit comprises at least one transmitting coil configured to provide electromagnetic energy, i.e., the apparatus may comprise a part of a wireless charger or may represent a wireless charger, the wireless charging unit of the apparatus may be placed near to a further apparatus to be wirelessly charged such that an electromagnetic wave emitted from said wireless charging unit may be received by at least one receiving coil of said further apparatus, wherein, for instance, the surface may be placed near to the further apparatus.

According to a first exemplary embodiment of a second aspect of the invention, an apparatus is disclosed, the apparatus comprising wireless charging unit, at least one capacitance sensing element at least partially placed in proximity to the wireless charging unit, wherein each capacitance sensing element is configured to sense a capacitance representative, a detection unit configured to detect an object based on at least one sensed capacitance representative of the at least one capacitance representative sensed by the at least one capacitance sensing element of said apparatus, to verify whether this determined object shall be associated with a predefined type of objects, and, if said detected object shall be associated with the predefined type of object, to associate the detected object with the predefined type of objects.

According to a second exemplary embodiment of a second aspect of the invention, a method is disclosed, the method comprising detecting an object based on at least one sensed capacitance representative of the at least one capacitance representative sensed by at least one capacitance sensing element of said apparatus, the apparatus further comprising a wireless charging unit, wherein the at least one capacitance sensing element is placed at least partially in proximity to the wireless charging unit, verifying whether this determined object shall be associated with a predefined type of objects, and, if said detected object shall be associated with the predefined type of object, associating the detected object with the predefined type of objects.

According to a third exemplary embodiment of a second aspect of the invention, an apparatus is disclosed, which is configured to perform the method according to the second aspect of the invention, or which comprises means for wireless charging, at least one capacitance sensing means at least partially placed in proximity to the means for wireless charging, wherein each capacitance sensing means is configured to sense a capacitance representative, detection means for detecting an object based on at least one sensed capacitance representative of the at least one capacitance representative sensed by the at least one capacitance sensing element of said apparatus, for verifying whether this determined object shall be associated with a predefined type of objects, and, if said detected object shall be associated with the predefined type of object, for associating the detected object with the predefined type of objects.

According to a fourth exemplary embodiment of a second aspect of the invention, an apparatus is disclosed, comprising at least one processor and at least one memory including computer program code, the at least one memory and the computer program code configured to, with the at least one processor, cause the apparatus at least to perform the method according to the second aspect of the invention. The computer program code included in the memory may for instance at least partially represent software and/or firmware for the processor. Non-limiting examples of the memory are a Random-Access Memory (RAM) or a Read-Only Memory (ROM) that is accessible by the processor.

According to a fifth exemplary embodiment of a second aspect of the invention, a computer program is disclosed, comprising program code for performing the method according to the second aspect of the invention when the computer program is executed on a processor. The computer program may for instance be distributable via a network, such as for instance the Internet. The computer program may for instance be storable or able to encode in a computer-readable medium. The computer program may for instance at least partially represent software and/or firmware of the processor.

According to a sixth exemplary embodiment of an aspect of the invention, a computer-readable medium is disclosed, having a computer program according to a second aspect of the invention stored thereon. The computer-readable medium may for instance be embodied as an electric, magnetic, electro-magnetic, optic or other storage medium, and may either be a removable medium or a medium that is fixedly installed in an apparatus or device. Non-limiting examples of such a computer-readable medium are a RAM or ROM. The computer-readable medium may for instance be a tangible medium, for instance a tangible storage medium. A computer-readable medium is understood to be readable by a computer, such as for instance a processor.

In the following, features and embodiments pertaining to all of these above-described aspects of the invention will be briefly summarized.

It has to be understood that the second aspect of the invention may for instance represent a separate aspect compared to the first aspect of the invention, but, as another example, the second aspect of the invention may also be considered to be based on the first aspect of the invention. Thus, explanations given with respect to first aspect of the invention may also hold for the second aspect of the invention, in particular with respect to the at least one capacitance sensing element, and/or the capacitance sensing structure, and/or the wireless charging unit, and/or with respect to the detection unit. For instance, the additional subject-matter of any one of the dependent claims associated with the first aspect of the invention and the additional subject-matter of any one of the exemplary embodiments of the first aspect of the invention might be considered to represent an exemplary embodiment of the second aspect of the invention.

An object is detected based on at least one capacitance representative of at least one capacitance representative sensed by at least one capacitance sensing element of the apparatus. Said object detection may be performed as described with any one of the examples presented with respect to the first aspect of the invention. For instance, said object detection may comprise sensing at least one capacitance representative as explained with respect to the first aspect of the invention by means of at least one of the at least one capacitance sensing element, wherein, for instance, he at least one sensing element might for instance realized by any of the sensing structures mentioned with respect to the first aspect of the invention.

Then, it is determined whether this detected object may be associated with a predefined type of objects. For instance, said predefined type of objects may represent the predefined type of objects of the first aspect of the invention, wherein this predefined type of object might be associated with at least one foreign object, as mentioned above.

For instance, this determining whether this detected object may be associated with a predefined type of objects might be performed based on training data, i.e., a known object may be placed in the predefined region in which the object can be sensed based on at least one capacitance sensing element of the at least one capacitance sensing element, and when the object is detected, it is decided in step that his detected object shall be associated with the predefined type of object.

Or, as another example, the detected object might be presented to a user via an interface, e.g., a captured image of the detected object might be presented to a user via a display or a feature of an object determined on the feature detection of the first aspect of the invention might be presented to a user via display, and the user may decide whether this detected object shall be associated with the predefined type of objects or not by means of a user interaction. Thus, determining whether the detected object may be associated with a predefined type of objects may comprise evaluating a user interaction which might be received via an interface, e.g., the capacitance sensing structure when implemented as touch sensitive capacitance sensing structure, being indicative whether the detected object shall be associated with the predefined type of objects or not.

If it is determined that the detected object shall be associated with a predefined type of objects, the detected object is associated with the predefined type of objects. Accordingly, the method may be configured to train and to learn new objects which can be detected based on the at least one capacitance sensing element and which can be associated with the predefined type of objects if the detected object shall be associated with the predefined type of objects. Thus, for instance, a plurality of foreign objects may be associated with the predefined type of object based on the second aspect of the invention.

This associating a detected object with the predefined type of objects may be performed in a way that in accordance with determining whether a detected object corresponds to the predefined type of objects of the first aspect of the invention it is possible to determine whether a detected object matches with an object associated with the predefined type of objects. For instance, the second aspect of the invention may comprise determining a matching rule for the detected object, wherein this matching rule is associated with the detected object, and wherein the matching rule is configured to be by the first aspect of the invention for determining whether a detected object corresponds to the object associated with the matching rule (and associated with the predefined list of objects).

This matching rule may represent any of the matching rules mentioned above and it may be derived based on at least one capacitance representative of the at least one capacitance representative sensed when the object is detected.

For instance, said matching rule may comprise at least one predefined capacitance value and/or at least one predefined change of a capacitance value, wherein each of this at least one predefined capacitance value and/or at least one predefined change of a capacitance value is associated with a different capacitance sensing element of the at least one capacitance sensing element. Or, as another example, said matching rule might comprise at least one predefined range of capacitance values and/or at least one predefined range of changes of a capacitance value, wherein each of this at least one predefined range of capacitance values and/or at least one predefined range of changes of a capacitance value is associated with a different capacitance sensing element of the at least one capacitance sensing element.

As an example, if determining whether a detected object corresponds to the predefined type of objects of the first aspect of the invention is based on a comparison whether an image captured based on at least one capacitance representative of at least one capacitance sensor at least partially matches with an image of an object associated with the predefined type of objects, the capacitance sensing structure may comprise a plurality of capacitance sensing elements, and the second aspect of the invention may comprise capturing an image based on at least one capacitance representative sensed by at least one capacitance sensing element of the plurality of capacitance sensing elements, and associating the captured image or at least a part of the captured image as a reference image of this object with the predefined type of objects. Thus, as an example, the matching rule associated with the detected object may comprise this reference image.

Or, as another example, if determining whether a detected object corresponds to the predefined type of objects of the first aspect of the invention is based on determining a feature of an object based on at least one capacitance representative, and based on determining whether the determined feature at least partially corresponds to a predefined feature associated with the predefined type of objects, the second aspect of the invention may comprise determining a feature of an object based on at least one capacitance representative as explained with respect to the first aspect of the invention, and the second aspect of the invention may comprise associating a representative of this determined feature of this object with the predefined type of objects, e.g. by associating this representative of the determined feature as predefined feature in the list comprising at least one predefined feature. As an example, the matching rule associated with the detected object may comprise this predefined feature.

For instance, if the feature represents a shape of the object, this shape may be determined by the second aspect of the invention based on an edge detection which may be performed in a subpart of the captured image or the complete captured image as explained with respect to first aspect of the invention. Then, as an example, the second aspect of the invention may comprise associating a representative of the determined shape of this object with the predefined type of objects, e.g. by associating this representative of the determined shape as predefined feature in the list comprising at least one predefined feature. Thus, as an example, the matching rule associated with the detected object may comprise this representative of the shape as predefined feature.

For instance, said detected shape may represent a new image comprising shape information, which might for instance be generated based on said edge detection, wherein this new image might be compared with a predefined image associated with the predefined type of objects. Thus, for instance, with respect to the above mentioned list comprising at least one predefined feature associated with the predefined type of objects, this list might comprise at least one predefined image comprising shape information as representative of the determined shape, wherein each predefined image may be associated with a respective predefined object.

As an example, the edge detection algorithm for determining the shape may be based or may represent one of: a Sobel-Operator, a Scharr-Operator, a Laplace-Filter, a Prewitt-Operator, a Roberts-Operator, a Kirsch-Operator, a Canny-Algorithmus, and Marr-Hildreth-Operator.

Furthermore, for instance, said determined shape may represent the type of the shape, e.g. circular, quadratic, elliptic, rectangular and/or any other well-suited shape, and, for instance, the determined shape may further comprise information on the size of the shape. Then, as an example, with respect to the above mentioned list comprising at least one predefined feature associated with the predefined type of objects, this list might comprise at least one type of shape as representative of the determined shape, wherein each type of shape is associated with a respective predefined object.

Accordingly, the second aspect of the invention enables to train the recognition of objects which might be performed based on training objects and/or user interaction. For instance, this information obtained by training enables a better determining whether a detected object is associated with the predefined type of objects.

Furthermore, the second aspect of the invention may further be used to associate at least one detected object with the second predefined type of objects of the first aspect of the invention in the same way as explained with respect to the predefined type of objects.

Other features of all aspects of the invention will be apparent from and elucidated with reference to the detailed description of embodiments of the invention presented hereinafter in conjunction with the accompanying drawings. It is to be understood, however, that the drawings are designed solely for purposes of illustration and not as a definition of the limits of the invention, for which reference should be made to the appended claims. It should further be understood that the drawings are not drawn to scale and that they are merely intended to conceptually illustrate the structures and procedures described therein. In particular, presence of features in the drawings should not be considered to render these features mandatory for the invention.

BRIEF DESCRIPTION OF THE FIGURES

In the figures show:

FIG. 4*c*: a first example embodiment of a captured image when no object is present;

FIG. 8: a flowchart of an example embodiment of a method according to a second aspect of the invention.

DETAILED DESCRIPTION OF EMBODIMENTS OF THE INVENTION

Figure 1:
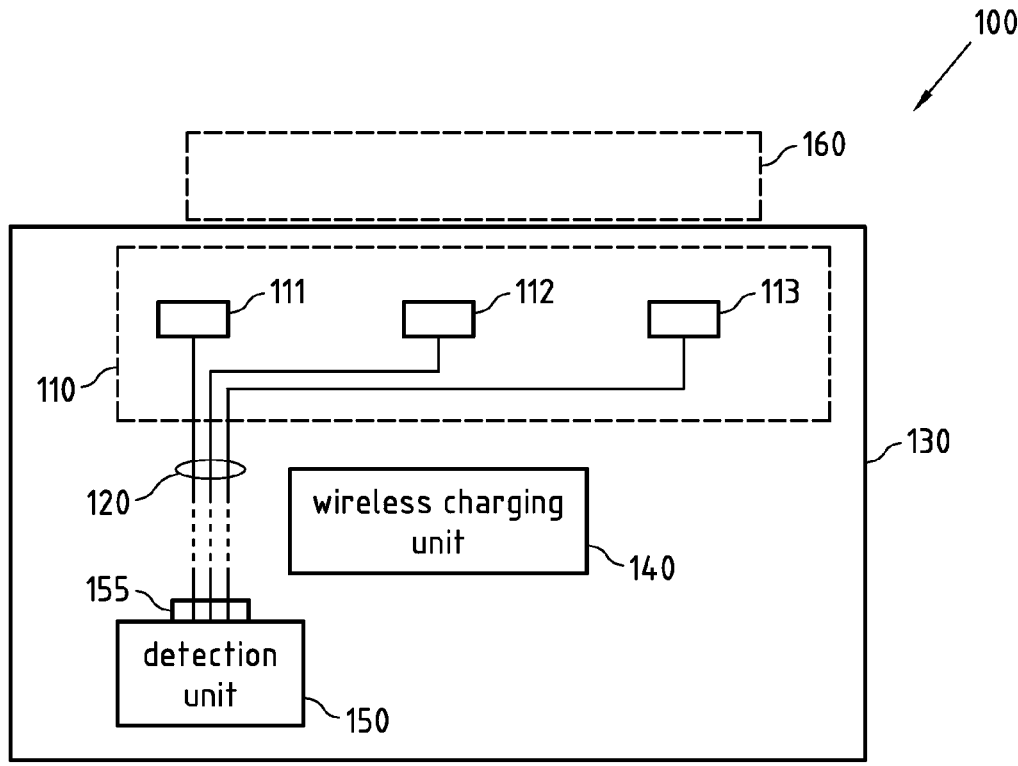
FIG. 1: A first example embodiment of an apparatus according to an aspect of the invention.

FIG. 1 depicts a first example embodiment of an apparatus 100 according to an aspect of the invention. This first example embodiment of an apparatus will be explained in conjunction with the flowchart 200 of a first example embodiment of a method 200 according to an aspect of the invention shown in FIG. 2. The steps of this flowchart 200 may for instance be defined by a program code of a computer program that is stored on a tangible storage medium. Tangible storage medium may for instance embody a program memory, and the computer program may then be executed by a processor. For instance, apparatus 100 may be implemented as a module and may for instance be part of a stationary or mobile apparatus, wherein the mobile apparatus may represent a mobile computer like a mobile pad, netbook or notebook which might comprise a mobile wireless phone functionality, or a mobile phone or a smartphone. For instance, said mobile phone or smartphone may represent a mobile phone in accordance with the 3rd Generation Partnership Project (3GPP).

The apparatus 100 comprises at least one capacitance sensing element 111, 112, 113. As an example, the at least one capacitance sensing element 111, 112, 113 may be considered as a capacitance sensing structure 110, as exemplarily denoted by reference sign 110 in FIG. 1. Although FIG. 1 depicts a plurality of capacitance sensing elements 112, 112, 113, it has to be understood that the apparatus 100 may for instance comprise a single one capacitance sensing element, e.g. sensing element 111 or sensing element 112 or sensing element 113.

For instance, a capacitance sensing element of the at least one capacitance sensing element 111, 112, 112 is configured to sense a capacitance representative, wherein, as an example, this capacitance representative may represent a capacitance or a change of a capacitance.

Figure 2:
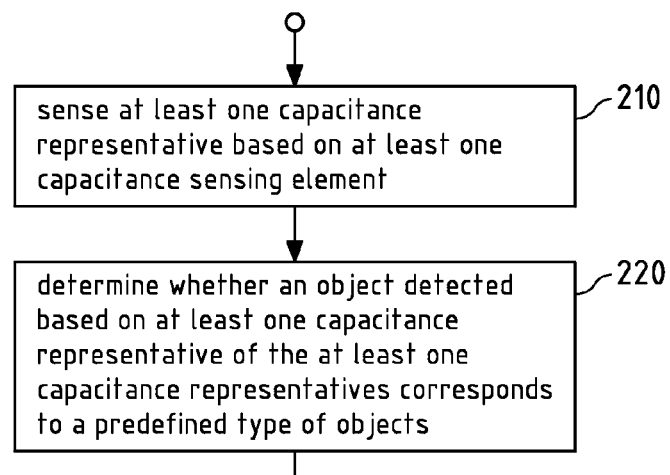
FIG. 2: a flowchart of a first example embodiment of a method according to an aspect of the invention.

Thus, as an example, in a step 210 depicted in method 200 in FIG. 2, at least one capacitance representative may be sensed by at least one capacitance sensing element 111, 112, 113.

Furthermore, for instance, a capacitance sensing element of the at least one capacitance sensing element 111, 112, 112 may be configured to output a signal being indicative of the sensed capacitance representative, wherein this signal being indicative of the sensed capacitance representative might for instance be a signal being indicate of the sensed capacitance and/or indicative of a change of the sensed capacitance, wherein a capacitance sensing element might comprise a signal line for outputting this signal being indicative of the sensed capacitance representative. For instance, an input 150 of a detection unit 150 of the apparatus 100 may be connected to each capacitance sensing element 111, 112, 113 via the respective signals lines 120 in order to receive the signal being indicative of the sensed capacitance representative. As an example, a capacitance sensing element of the at least one capacitance sensing element 111, 112, 112 may comprise a capacitor.

Furthermore, the apparatus 100 comprises a wireless charging unit 140. This wireless charging unit 140 may be configured to perform a wireless energy transfer via an electromagnetic field. For instance, the wireless charging unit 140 may comprise at least one transmitting coil configured to provide electromagnetic energy via an electromagnetic field generated by said at least one transmitting coil, and/or, the wireless charging unit 140 may comprise at least one receiving coil configured to receive electromagnetic energy via an electromagnetic field generated from a further apparatus, wherein this further apparatus may represent a wireless charger comprising at least one transmitting coil. For instance, as exemplarily depicted in FIG. 1, the wireless charging unit may be disposed under a surface 130 of the apparatus. Thus, as an example, if a wireless charging should be performed, and if the wireless charging unit 140 comprises at least one receiving coil configured to receive electromagnetic energy, the wireless charging unit 140 of the apparatus 100 may be placed near to a wireless charger such that the wireless charging unit 140 receives an electromagnetic wave emitted from said wireless charger, wherein, for instance, the surface 130 may be placed near to the wireless charger. Of, as an example, if the wireless charging unit 140 comprises at least one transmitting coil configured to provide electromagnetic energy, i.e., the apparatus 100 may comprise a part of a wireless charger or may represent a wireless charger, the wireless charging unit 140 of the apparatus 100 may be placed near to a further apparatus to be wirelessly charged such that an electromagnetic wave emitted from said wireless charging unit 140 may be received by at least one receiving coil of said further apparatus, wherein, for instance, the surface 130 may be placed near to the further apparatus.

The at least one capacitance sensing element 111, 112, 113 is at least partially placed in proximity to the wireless charging unit 140. As an example, this placing of the at least one capacitance sensing element 111, 112, 113 may be performed in a way that a metallic object located in a predefined area 160 might be detected by or based on at least one of the at least one capacitance sensing element 111, 112, 113, e.g. by means of a deviation of a capacitance value sensed by each of this at least one capacitance sensing element 111, 112, 113 of the at least one sensing element 111, 112, 113. For instance, said predefined area 160 is located at least partially in the electromagnetic field of a wireless energy transfer when the wireless charging unit 140 is used for transmitting power or used for receiving power. Thus, as an example, with respect to the exemplary arrangement depicted in FIG. 1, this predefined area may be in an environment of the surface 130 located above the wireless charging unit 140, i.e. at least partially located outside the apparatus 100. It has to be understood that the predefined area 160 depicted in FIG. 1 represents an example and might change depending on the type and/or on the arrangement of the at least one capacitance sensing element 111, 112, 113. As an example, the predefined region might be considered as a detection region in which objects might be detected based on at least one of the least one capacitance sensing element 111, 112, 113.

Accordingly, for instance, at least one of the at least one capacitance sensing element 111, 112, 113 may be placed on a position with respect to the wireless charging unit 140 in which an object might be detected by or based on the at least one of the at least one capacitance sensing element 111, 112, 113 if said object is located on a position in which it might influence a wireless energy transfer when the wireless charging unit 140 is used for the wireless energy transfer, i.e., this position might represent a position in which the object might influence the electromagnetic field of the wireless energy transfer.

For instance, during sensing a capacitance by at least one of the at least one capacitance sensing element 111, 112, 113 the wireless charging unit 140 might be deactivated, wherein this deactivating might comprise deactivating a transmitting coil of the wireless charging unit 140 such that no electromagnetic field is generated by the wireless charging unit 140 during sensing the capacitance by at least one of the at least one capacitance sensing elements 111, 112, 113. Or, if said wireless charging unit 140 comprises a receiving coil, a control signal might be transmitted to a further wireless charger in order to indicate the further wireless charger to deactivate its transmitting coil in order to avoid influences of a electromagnetic field generated by the further wireless charger on at least one of the at least one of the at least one capacitance sensing elements 111, 112, 113.

Then, in a step 220, it is determined whether an object detected based on at least one capacitance representative of the at least one capacitance representative sensed by the at least one capacitance sensing element 111, 112, 113 corresponds to a predefined type of objects.

For instance, an object might be detected based on the change of a sensed capacitance representative sensed by at least one capacitance sensing element 111, 112, 113 compared to a sensed capacitance representative when no object is placed in the predefined region. As an example, if an object at least partially comprises metal and/or at least partially comprises magnetic material, the capacitance of at least on capacitance sensing element of the at least one capacitance sensing element 111, 112, 113 may change when this object is placed near to this at least one capacitance sensing element, i.e., for instance, when the object is located in a distance to at least one of the at least one capacitance sensing element 111, 112, 113 in which it may influences the capacitance of at least one of the at least one capacitance sensing element 111, 112, 113, and the respective capacitance element 111, 112, 113 may output a signal being indicate of the change capacitance representative. Accordingly, as an example, based on a sensed capacitance representative sensed by at least one capacitance sensing element 111, 112, 113 an object might be detected when this object might be placed in the predefined region 160 depicted in FIG. 1. For instance, this example of detecting an object based on at least one sensed capacitance (step 210) might be performed by means of the detection unit 150 depicted in FIG. 1. As an example, this detection unit 150 might comprise logic for controlling the at least one capacitance sensing element 111, 112, 113 and for reading a signal being indicative of the capacitance and/or being indicative of a change of a capacitance from each of the capacitance sensing elements 111, 112, 113.

Furthermore, in step 220 is checked whether a object detected based on at least one capacitance representative of the at least one capacitance representative sensed by the at least one capacitance sensing element 111, 112, 113 corresponds to a predefined type of objects. For instance, said predefined type of objects may be associated or may define foreign objects which would interfere a wireless charging performed by the wireless charging unit 140 when at least partially placed in the electromagnetic field. As an example, if such a foreign object is placed at least partially in the electromagnetic field this foreign object may act as an additional load and heat may be generated at such a foreign object caused by eddy currents induced in this foreign. This may particularly hold for foreign objects comprising metal.

This generation of heat at a foreign object might cause problems and, further, efficiency of wireless charging may be decreased since a part of the energy transmitted via the electromagnetic field is used for heating the foreign object. Accordingly, it may desirable to detect such a foreign object which would interfere the wireless charging.

Thus, as an example, said predefined type of objects may be associated or may define at least one foreign object which can be detected based on at least one sensed capacitance and/or based on a change of capacitance sensed by at least one capacitance sensing element 111, 112, 113 of the at least one capacitance sensing element 111, 112, 113.

For instance, a foreign object of said at least one foreign object of said predefined type of objects might be associated with a matching rule, wherein this matching rule may comprise at least one predefined capacitance value and/or at least one predefined change of a capacitance value, wherein each of this at least one predefined capacitance value and/or at least one predefined change of a capacitance value is associated with a different capacitance sensing element 111, 112, 113 of the at least one capacitance sensing element 111, 112, 113. Then, as an example, it may be determined at step 220 for an foreign object of said at least one foreign object of said predefined type of objects whether the respective matching rule is fulfilled with respect to at least one sensed capacitance value representative, wherein this checking whether the respective matching rule is fulfilled may comprise determining whether at least one predefined capacitance value and/or at least one predefined change of a capacitance value associated with the respective foreign object at least partially (or approximately or exactly) matches with the corresponding sensed at least one capacitance value and/or the corresponding sensed at least one change of a capacitance value sensed the at least one capacitance sensing element associated with the respective foreign object, and if such a match is determined, it is determined in step 220 that the detected object corresponds to the respective foreign object associated or defined by the predefined type of objects. For instance, said at least partially matching or approximately matching may lead to a positive matching results if a sensed value does not differ more than 10% or not more than 5% of the respective predefined value (e.g., capacitance value or change of capacitance value) of the respective matching rule.

Or, as an example, the matching associated with a foreign object of said at least one foreign object of said predefined type of objects might comprise at least one predefined range of capacitance values and/or at least one predefined range of changes of a capacitance value, wherein each of this at least one predefined capacitance value and/or at least one predefined change of a capacitance value is associated with a different capacitance sensing element 111, 112, 113 of the at least one capacitance sensing element 111, 112, 113. Then, as an example, it may be determined at step 220 for an foreign object of said at least one foreign object of said predefined type of objects whether the respective matching rule is fulfilled with respect to at least one sensed capacitance value representative, wherein this checking whether the respective matching rule is fulfilled may comprise determining whether at least one predefined range of capacitance values and/or at least one predefined range of changes of a capacitance value associated with the respective foreign object at least partially (or approximately or exactly) matches with the corresponding sensed at least one capacitance value and/or the corresponding sensed at least one change of a capacitance value sensed the at least one capacitance sensing element associated with the respective foreign object, and if such a match is determined, it is determined in step 220 that the detected object corresponds to the respective foreign object associated or defined by the predefined type of objects. For instance, said at least partially matching or approximately matching may lead to a positive matching results if a sensed value does not differ more than 10% or not more than 5% of the respective predefined range of values (e.g., range of capacitance values or range of changes of capacitance value), if an exact match is desired, if a sensed value is within the respective predefined range of values.

It has to be understood that other ways of determining whether an foreign object associated with the predefined type of objects based on at least one sensed capacitance representative sensed by at least one of the at least one capacitance sensing element 111, 112, 113 may be performed in step 220.

For instance, in step 220 it may be determined for at least one foreign object of the at least one foreign object associated with the predefined type of objects whether the respective foreign object matches with a detected object based on at least one sensed capacitance representative sensed by at least one of the at least one capacitance sensing element 111, 112, 113 and based on the matching rule associated with the respective foreign object, and if the at least one sensed capacitance representative sensed by at least one of the at least one capacitance sensing element 111, 112, 113 indicates that the detected object represents a respective foreign object of the predefined type of objects in accordance with the matching rule, it may be determined in step 220 that the object detected in step 210 represents an object that corresponds to the predefined type of objects. Otherwise, if the at least one sensed capacitance representative sensed by at least one of the at least one capacitance sensing element 111, 112, 113 does not lead to a successful match with a foreign object associated with the predefined type of object, it is determined in step 220 that the object detected in step 210 does not correspond to the predefined type of objects.

Furthermore, as an example, when determining whether the detected object corresponds to the predefined type of object, the detection unit 150 may be configured to distinguish between an object which matches with one foreign object of the at least one foreign object associated with the predefined type of object and an object which corresponds to an allowable further apparatus configured to perform wireless charging which can be used to perform wireless charging in conjunction with the wireless charging unit 140 of apparatus 100, wherein said further wireless apparatus configured to perform wireless charging may represent a wireless charger and wherein said wireless charging unit 140 may comprise at least one receiving coil configured to receive energy from said wireless charger, and/or wherein said further wireless apparatus configured to perform wireless charging may comprise at least one receiving coil configured to receive wireless energy and wherein said wireless charging unit 140 may comprise at least one transmitting coil configured to provide wireless energy.

For instance, a second predefined type of objects may be associated with at least one wireless charge object and/or at least one object not influencing wireless charging, wherein a wireless charge object of the said at least one wireless charge object may represent the above mentioned wireless apparatus configured to perform wireless charging, e.g. a wireless charger or a wireless apparatus comprising at least one receiving coil configured to receive wireless energy.

For instance, a wireless charge object of the at least one wireless charge object and/or an object not influencing wireless charging of the second predefined type of objects might be associated with a matching rule, wherein this matching rule may comprise at least one predefined capacitance value and/or at least one predefined change of a capacitance value, wherein each of this at least one predefined capacitance value and/or at least one predefined change of a capacitance value is associated with a different capacitance sensing element 111, 112, 113 of the at least one capacitance sensing element 111, 112, 113, and/or this matching rule may comprise at least one predefined range of capacitance values and/or at least one predefined range of changes of a capacitance value, wherein each of this at least one predefined capacitance value and/or at least one predefined change of a capacitance value is associated with a different capacitance sensing element 111, 112, 113 of the at least one capacitance sensing element 111, 112, 113, wherein a match of a detected object can determined as described with respect to determining a match of a detected object with a foreign object based on matching rule associated with the foreign object.

Thus, as an example, in step 220, the detector 150 may be configured to determine whether a detected object matches with a wireless charge object of the at least one wireless charge object associated with the second predefined type of objects based on at least one capacitance representative of the at least one sensed capacitance representative and based on the matching rule associated with the respective wireless charge object, and if no match is determined with respect to each wireless charge object of the at least one wireless charge object of the second predefined type of objects it may be determined in step 220 that the detected object is associated with the predefined type of objects, since the detected object does not represent a wireless charge object and thus may be assumed to represent a foreign object.

For instance, said matching rules associated with a foreign object or said matching rules associated with a wireless charge object may be determined based on a training with known objects, wherein a known object may placed in the predefined region 160, at least one capacitance representative may be sensed, and wherein a matching rule for this known object may be determined based on at least one capacitance representative of the sensed at least one capacitance representative is determined.

Accordingly, apparatus 100 and method 200 may be used to detect a foreign object based on at least one sensed capacitance representative sensed by at least one of the at least one capacitance sensing element.

Figure 3A:
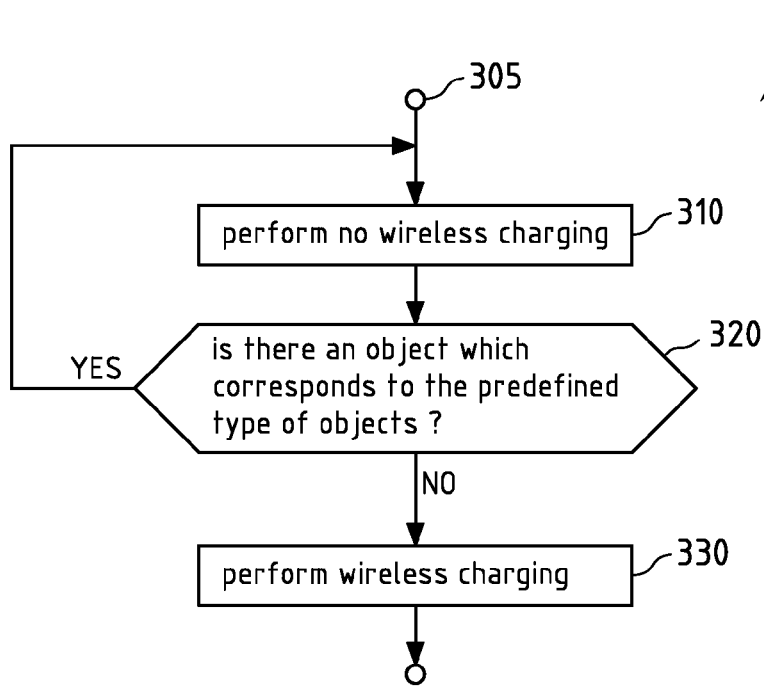
FIG. 3*a*: a flowchart of a second example embodiment of a method according to an aspect of the invention.

FIG. 3a depicts a flowchart 300 of a second example embodiment of a method according to an aspect of the invention which may be performed based on the method 200 depicted in FIG. 2 and may be performed by apparatus 100 depicted in FIG. 1.

In a step 310 no wireless charging is performed. Thus, if apparatus 100 is used, the wireless charging unit 140 is deactivated as explained with respect to FIG. 1. Accordingly, no electromagnetic field used by a wireless charging process may interfere with at least one of the at least one capacitance sensing element 111, 112, 113.

In a step 320 it is checked whether there is an object which corresponds to the predefined type of objects based on at least one capacitance representative sensed by at least one capacitance sensing element 111, 112, 113 of the at least one capacitance sensing element 111, 112, 113.

For instance, this checking whether there is an object which corresponds to the predefined type of objects may comprise step 220, i.e. determining whether an object detected based on at least one capacitance representative corresponds to a predefined type of objects as explained with respect to step 220.

If there is an object which corresponds to the predefined type of object, it may be assumed that this object represents a foreign object and thus method 300 may decide at step 320 not to perform charging and, for instance, to jump back to the beginning of the method 300 indicated by reference sign 305. Otherwise, if the checking performed in step 320 leads to the result that there is no object which corresponds to the predefined type of objects, the method 300 may proceed with performing a wireless charging at step 330. For instance, this performing wireless charging may comprise activating the wireless charging unit 140 depicted in FIG. 3a.

Accordingly, as an example, wireless charging can be avoided when there is a foreign object detected which might interfere with the electromagnetic field used for such a wireless charging process. Thus, only predefined objects associated with the predefined type of objects are excluded from being charged, but any other objects not being associated with the predefined type of objects are allowed to charge.

Figure 3B:
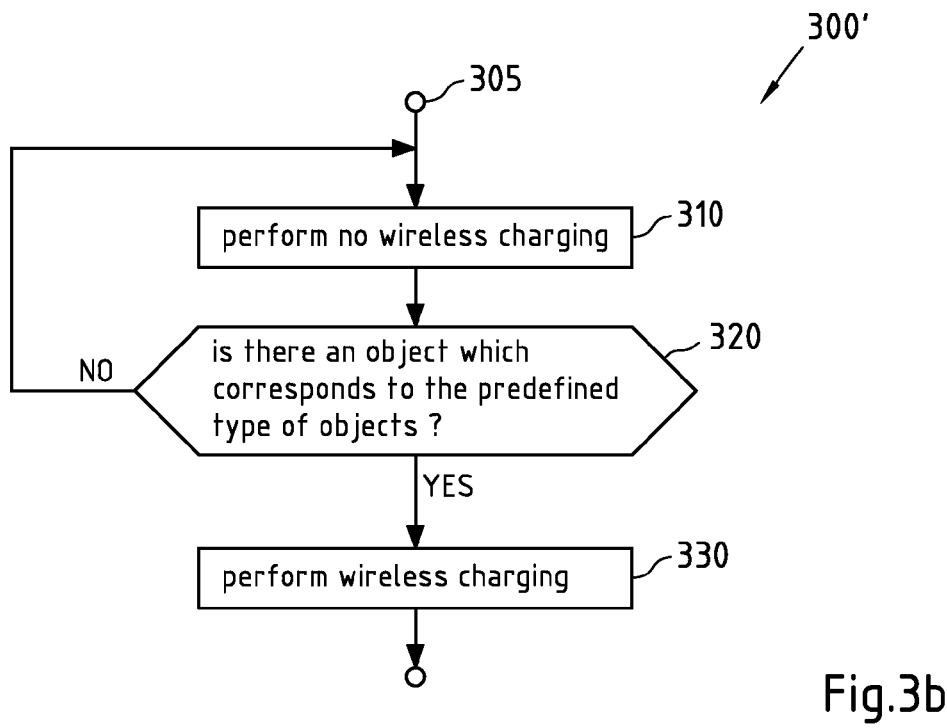
FIG. 3*b*: a flowchart of a third example embodiment of a method according to an aspect of the invention.

FIG. 3b depicts a flowchart 300' of a third example embodiment of a method according to an aspect of the invention which is based on the flowchart 300 of the second example embodiment of a method depicted in FIG. 300, wherein method 300' differs from method 300 in the way that charging is performed if it is detected in step 320 that there is an object which corresponds to the predefined type of objects.

Thus, in this case, the predefined type of objects may be associated with at least one object which is considered to represent a partner object for performing wireless charging, e.g. a wireless charger or an apparatus configured to receive energy by a wireless charger. For instance, the predefined type of objects may be not associated with a foreign object. Thus, only if the check performed in step 320 leads to a positive result wireless charging is performed in step 330, otherwise not wireless charging is performed. Accordingly, only predefined objects associated with the predefined type of objects are allowed to charge and all other objects will not be allowed to charge.

Figure 4A:
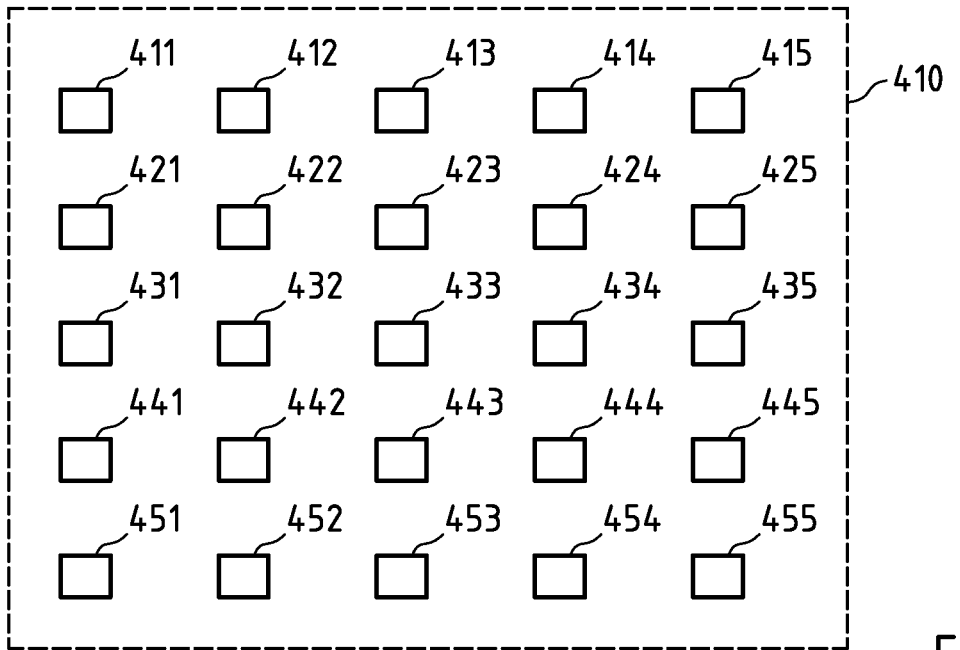
FIG. 4*a*: a first example embodiment of capacitance sensing structure.
Figure 4B:
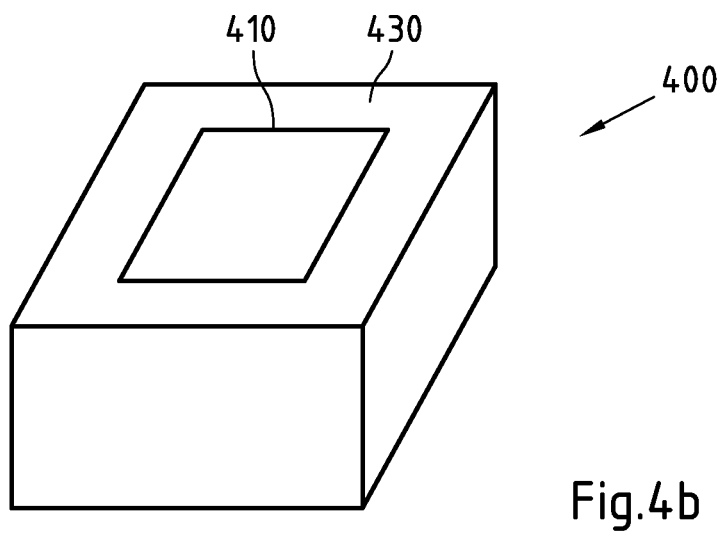
FIG. 4*b*: a second example embodiment of an apparatus according to an aspect of the invention.

FIG. 4a depicts a first example embodiment of a capacitance sensing structure 410. For instance, this capacitance sensing structure 410 may be used for the capacitance sensing structure 110 of apparatus 100 depicted in FIG. 1. This first example embodiment of a capacitance sensing structure 410 will be explained in conjunction with a second example embodiment of an apparatus 400 according to an aspect of the invention depicted in FIG. 4b, wherein this apparatus 100 may represent or may be based on apparatus 100 depicted in FIG. 4a.

The capacitance sensing structure 410 comprises a plurality of capacitance sensing elements 411-415, 421-425, 431-435, 441-445, 451-455, wherein a capacitance sensing element of this plurality of capacitance sensing elements may correspond or be based on one of the capacitance sensing element 111, 112, 113 depicted in FIG. 1. Thus, the explanations given with respect to the at least one capacitance sensing element 111, 112, 113 depicted in FIG. 1 may also hold for at least one capacitance sensing element of the plurality of capacitance sensing elements 411-415, 421-425, 431-435, 441-445, 451-455 depicted in FIG. 4. For instance, the plurality of capacitance sensing elements 411-415, 421-425, 431-435, 441-445, 451-455 may be arranged in form of a matrix, wherein the capacitance sensing elements may be arranged in columns and rows, but it has to be understood that the plurality of capacitance sensing elements may be arranged in any well-suited arrangement. As an example, the plurality of capacitance sensing elements 411-415, 421-425, 431-435, 441-445, 451-455 may be substantially or exactly arranged in plane. Furthermore, as an example, the capacitance sensing elements of the capacitance sensing structure 410 may further be configured to change their capacitance when touched. Thus, the capacitance sensing structure 410 may be used as a kind of touchpad and may, for instance, serve as a kind of user interface for receiving a user input.

Accordingly, the capacitance sensing structure 410 comprising the plurality of capacitance sensing elements 411-415, 421-425, 431-435, 441-445, 451-455 may be configured to be used for capturing an image of an object disposed on the capacitance sensing structure 410, wherein a respective capacitance representative sensed by a respective capacitance sensing elements of the plurality of capacitance sensing elements 411-415, 421-425, 431-435, 441-445, 451-455 may represent or may be used for determining an image element of the image. Thus, as an example, the image may comprise a plurality of image elements and each image element of the plurality of image elements may be captured by or based on a different capacitance sensing element of the plurality of capacitance sensing elements 411-415, 421-425, 431-435, 441-445, 451-455. For instance, the detection unit 150 (not depicted in FIG. 4b) might be configured to determine an image based on the plurality of sensed capacitance representatives. For instance, an image element may be indicative of the intensity of the sensed capacitance or may be indicative of the change of an intensity of the sensed capacitance of the respective capacitance sensing element associated with this image element. As an example, an image element may represent a pixel.

As an example, the capacitance sensing structure 410 comprising the plurality of capacitance sensing elements 411-415, 421-425, 431-435, 441-445, 451-455 might be disposed on or under a surface 430 of the apparatus 400 such that an object disposed in an environment above the capacitance sensing structure 410 and above the surface 430 can be detected by the capacitance sensing structure 410, wherein for instance an image of this object might be captured based on at least one sensed capacitance representative sensed by at least one capacitance sensing element of the plurality of capacitance sensing elements 411-415, 421-425, 431-435, 441-445, 451-455. Accordingly, the predefined region 160 depicted in FIG. 1 might for instance represent a region above the surface 430 of the apparatus 400 which can be captured by the plurality of capacitance sensing elements 411-415, 421-425, 431-435, 441-445, 451-455.

Furthermore, as an example, the wireless charging unit 140 may be disposed in apparatus 400 beneath the capacitance sensing structure 410. Thus, for instance, the predefined region 160 may be located at least partially in the region of an electromagnetic field above the surface 430 when the wireless charging unit 140 is activated.

FIG. 4c depicts a first example embodiment of a captured image captured by a capacitance sensing structure 410 when no object is present in the predefined region 160.

Figures 4D, 5:
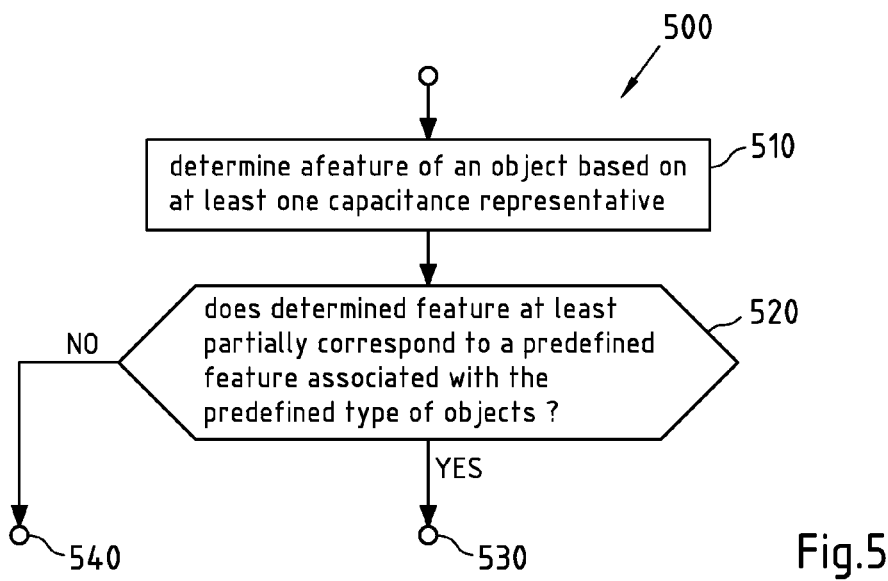
FIG. 4*d*: a second example embodiment of a captured image when an object is present.
FIG. 5: a flowchart of a second example embodiment of a method according to an aspect of the invention.

In this example, it may be assumed without any limitation that the capacitance sensing structure 410 comprises a plurality of capacitance sensing elements arranged in a plurality of columns and rows in order to capture a corresponding image comprising a plurality of image elements arranged in columns and rows in accordance with the arrangement of the plurality of capacitance sensing elements, wherein in FIG. 4c the columns are indicated by reference sign 441 and may for instance comprise columns a, b, c, . . . , l, i.e., 11 columns and wherein in FIG. 4d the rows are indicated by reference sign 442 and may for instance comprise rows 0, 1, 2, . . . 9, i.e., 10 rows, but is has to be understood that any other well suited number of columns and/or any other well suited number of rows may also be chosen.

FIG. 4c depicts an example of an image captured when no object is placed in the predefined area 160 above the surface 430 of apparatus 400, wherein each image element may be represented by a value corresponding to the respective capacitance representative sensed by the capacitance sensing element of the plurality of capacitance sensing elements associated with the respective image element. As an example, apparatus 400 may comprise an image transformer, which might represent a hardware entity or a software code running on a processor or a combination of both, configured to transform the sensed capacitance representatives of the plurality of capacitance sensing elements 411-415, 421-425, 431-435, 441-445, 451-455 to the image elements of an image captured by the plurality of sensing elements 411-415, 421-425, 431-435, 441-445, 451-455, wherein a capacitance representative associated with a respective capacitance sensing element of the plurality of capacitance sensing elements may be associated with a respective image element, and wherein a transformation function may be used for determining an image element based on the respective capacitance representative associated with this image element. For instance, said image transformer may represent a part of the detection unit 150.

As can be seen from FIG. 4c, the values of the different capacitance representative sensed in this no-object-situation may differ from zero due to noise or other effects, e.g. metallic components of the apparatus 400 placed near to a capacitance sensing element. As an example, the detection unit 150 might be configured to store this image data being associated with a non-object-situation in order to detect whether an object detected or not, i.e., this image data may be used as a kind of reference image data in order to detect changes in at least one capacitance representative sensed by at least one capacitance sensing element of the plurality of capacitance sensing elements in order to detect an object.

FIG. 4d depicts an example of an image captured when an object is placed in the predefined area 160 above the surface 430 of apparatus 400, wherein in this example the object represents a ring comprising metal. As can be seen from FIG. 4d, the image captured based on the plurality of capacitance sensing element comprises the structure of the ring, which may be in particular indicated by image elements c2, c3, c4, c5, c6, d5, d7, e7, f7, g7, h7, i6, k5, k4, k3, i2, h1, g1, f1, e2 and d2.

Accordingly, as an example, the detection unit 150 might be configured to determine whether a detected object corresponds to the predefined type of objects based on an image captured based on at least one capacitance representative sensed by at least one of the plurality of capacitance sensing elements.

For instance, this determining whether a detected object corresponds to the predefined type of objects based on a captured image may comprise comparing whether the captured image at least partially matches with an image of an object associated with the predefined type of objects. As, an example, for each object of at least one object associated with the predefined type of objects a kind of reference image might be stored, and if there is a match detected between the captured image and a reference image of an object of the at least one object, it might be determined at step 220 that the detected object represents an object that corresponds to a predefined type of object.

As an example, a match may be determined if the captured image at least partially corresponds to a reference image, or if a subpart of a captured image at least partially corresponds to a reference image. As an example, a correlation factor between the captured image and a reference image or a correlation factor of a subpart of the captured image and a reference image may be calculated, and if the correlation factor exceeds a predefined threshold, a match between the captured image and the reference image may be determined.

FIG. 5 depicts flowchart of a second example embodiment of a method 500 according to an aspect of the invention. For instance, method 500 may be used for determining whether an object corresponds to the predefined type of objects in step 220 of method 200 depicted in FIG. 2.

In a step 510 a feature of an object based on at least one capacitance representative is determined. For instance, this may comprise capturing an image as explained with respect to FIGS. 4a-4d, the image comprising a plurality of image element, wherein a feature of an object is determined based on image elements of said plurality of image element. For instance, said feature may represent any feature of the object which may be determined based on an image segmentation and which might be suitable to classify a detected object. As an example, this feature might represent a shape of the object, wherein shape may be understood to represent a geometric structure or form, e.g. a pattern or a profile of an object.

At a step 520 it is determined whether the determined feature at least partially corresponds to a predefined feature associated with the predefined type of objects. For instance, the predefined type of object may be associated with a list comprising at least one predefined feature, and if the determined feature at least partially corresponds to a predefined feature of said list the method 500 may proceed at reference sign 530 and it might be determined at step 220 of FIG. 2 that the detected object corresponds to the predefined type of objects.

For instance, a correlation value may be calculated between the determined feature and a predefined feature of the list, and if the correlation value exceeds a predefined threshold, it is determined in step 520 that the determined feature at least partially corresponds to the respective predefined feature of the list.

If it is determined in step 520 that the determined feature does not at least partially corresponds to a feature associated with the predefined type of object, e.g. if no calculated correlation value between the determined feature and each predefined feature of the list exceeds the predefined threshold, the method 500 may proceed at reference sign 540 and it may be determined at step 220 of FIG. 2 that the detected object does not correspond to the predefined type of objects.

It has to be understood that other matching algorithms in order to check whether the determined feature does at least partially correspond to a predefined of the list than the above mentioned correlation value based algorithm may also be applied.

Accordingly, based an a feature of an object, wherein the feature is determined based on at least one sensed capacitance representative, a classification of the detected object may performed and due to the classification it may be determined whether this object corresponds to the predefined type of objects or not.

For instance, if the feature represents a shape of the object this shape may be determined based on an edge detection which may be performed in a subpart of the captured image or the complete captured image. As an example, the edge detection may represent a detection algorithm which identifies image element in the captured image at which the image element intensity may change sharply or may have discontinuities.

For instance, said detected shape may represent a new image comprising shape information, which might for instance be generated based on said edge detection, wherein this new image might be compared with a predefined image associated with the predefined type of objects. Thus, for instance, with respect to the above mentioned list comprising at least one predefined feature associated with the predefined type of objects, this list might comprise at least one predefined image comprising shape information, wherein each predefined image may be associated with a respective predefined object. Then, at step 520 it might be determined whether the new image comprising shape information at least partially corresponds to a predefined image comprising shape information in order to determine whether the determined feature (i.e., shape) at least partially corresponds to the a predefined feature associated with the predefined type of object. For instance, said example of calculating a correlation value may be used, wherein a correlation value between the new image or subpart of the new image and a predefined image of the list calculated and compared with the correlation threshold.

As an example, the edge detection algorithm for determining the shape may be based or may represent one of: a Sobel-Operator, a Scharr-Operator, a Laplace-Filter, a Prewitt-Operator, a Roberts-Operator, a Kirsch-Operator, a Canny-Algorithmus, and Marr-Hildreth-Operator.

Furthermore, for instance, said determined shape may represent the type of the shape, e.g. circular, quadratic, elliptic, rectangular and/or any other well-suited shape, and, for instance, the determined shape may further comprise information on the size of the shape. Then, as an example, with respect to the above mentioned list comprising at least one predefined feature associated with the predefined type of objects, this list might comprise at least one type of shape, wherein each type of shape is associated with a respective predefined object. Then, at step 520 it might be determined whether the determined type of shape at least partially corresponds to a predefined type of shape of the list in order to determine whether the determined feature (i.e., shape) at least partially corresponds to the a predefined feature associated with the predefined type of object. Furthermore, for instance, said determining may further comprise comparing the information on the size of the shape with a size associated with the respective predefined object of the list, and, for instance, if the size of the determined shape is less than size threshold, wherein the size threshold may depend on the size associated with the respective predefined object, it may determined that the determined object does not match with the respective predefined object, even if the determined type of shape at least partially corresponds to the type of shape associated with this predefined object.

Figure 6A:
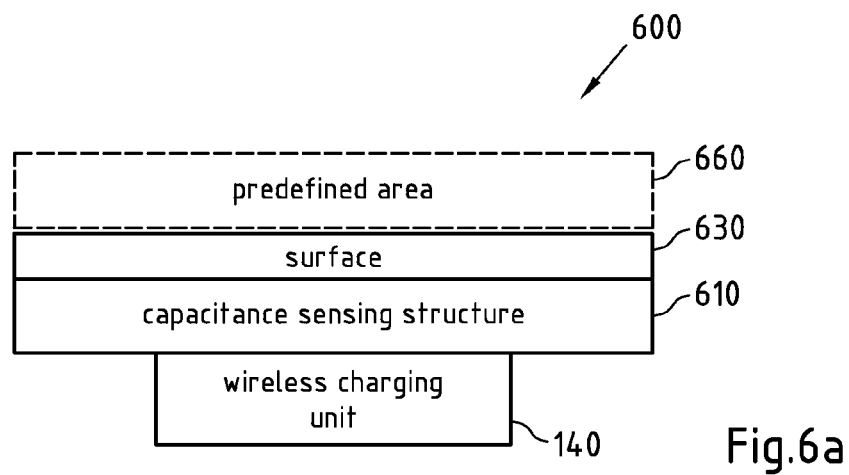
FIG. 6*a*: a cross-sectional view of a part of a third example embodiment of an apparatus according to an aspect of the invention.

FIG. 6a depicts a cross-sectional view of a part of a third example embodiment of an apparatus 600 according to an aspect of the invention.

The apparatus 600 comprises a capacitance sensing structure 610 comprising a plurality of capacitance sensing elements, wherein this capacitance sensing structure is formed as an layer 610 deposited at least partially above the wireless charging unit 410, wherein a part of a surface of the apparatus 630 is disposed on the capacitance sensing structure 610. Furthermore, for instance, the capacitance sensing structure 610 may form part of the surface 630 of the apparatus 600 (not depicted in FIG. 6a). The apparatus 600 may be based or may be part of apparatus 400 depicted in FIG. 4 and/or of apparatus 100 depicted in FIG. 1.

For instance, the capacitance sensing structure 610 may represent or may be based on the capacitance sensing structure 410 depicted in FIG. 4a. For instance, the layer 610 comprising the capacitance sensing structure 610 may overlap the wireless charging unit 140. Thus, as an example, the predefined region 660 in which objects may be detected by the plurality of capacitance sensing elements of the capacitance sensing structure 610 can be extended and foreign objects may be detected even when placed at a side region of the electromagnetic field.

Furthermore, as an example, the capacitance sensing elements of the capacitance sensing structure 610 may further be configured to change their capacitance when touched. Thus, the layer 610 may be used a kind of touchpad and may serve as user interface configured to receive a user input. For instance, the detection unit 150 might be configured to distinguish between tip on at least one capacitance sensing element indicated by a respective at least one capacitance representative and an object detected by at least one capacitance sensing element indicated by a respective at least one capacitance representative, e.g. since the change of the capacitance representative caused by a tip on the respective capacitance sensing element may be much higher than the change of the capacitance representative caused by an metallic or magnetic object placed in a sensing area of the respective capacitance sensing element.

For instance, as an example, the capacitance sensing structure 610 might further be configured to detect thermal deviations in the surface 630, e.g. caused by local hot spots. For instance, at least one capacitance sensing element of the at least one capacitance sensing element may comprise a dielectric medium which changes the permittivity over temperature. Thus, the capacitance representative of such a capacitance sensing element comprising this dielectric medium may comprise information on the temperature.

For instance, in step 220 this information may be used to determine that an object detected based on at least one capacitance representative corresponds to the predefined object if a temperature sensed by at least one capacitance sensing element exceeds a predefined temperature threshold.

Furthermore, as an example, a protective layer (not depicted in FIG. 6a) may be deposited under the wireless charger unit 140 in order to damp the electromagnetic field emitted into the inside of apparatus 600 when a wireless charging is performed and/or when the wireless charging unit 140 is active.

Figure 6B:
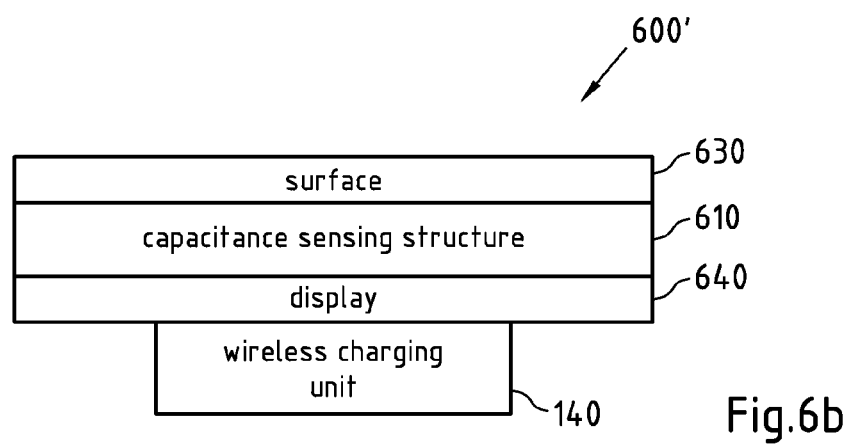
FIG. 6*b*: a cross-sectional view of a part of a fourth example embodiment of an apparatus according to an aspect of the invention.

FIG. 6b depicts a cross-sectional view of a part of a fourth example embodiment of an apparatus 600' according to an aspect of the invention which is based on apparatus 600 depicted in FIG. 6a.

Compared to the part of a fourth example embodiment of an apparatus 600 depicted in FIG. 6a, the apparatus 600' comprises a display 640 which may be deposited as a display layer beneath the capacitance sensing layer 610. Accordingly, this display 640 may serve as a user interface configured to present graphics, e.g. black and white or coloured, to a user. For instance, the apparatus 600' might be configured to provide an image captured based on the capacitance sensing structure to a user, which might be used for presenting a detected object which is determined to represent an object corresponding to the predefined type of objects, (e.g., a foreign object) to the user. Furthermore, as will be explained with respect to the method 800 depicted in FIG. 8, the display 640 might for instance be used for performing a training procedure in order to learn predefined objects being associated with the predefined type of objects.

Furthermore, the display 640 may be configured to provide other information to the user, e.g. information related to a potential further apparatus which is configured to perform wireless charging in conjunction with the wireless charging unit 140 of the apparatus 600, and/or information of a state of charge of a rechargeable energy source of the apparatus 600, and/or information of transmitted power/energy with regard to a wireless charging procedure (e.g. over time), and/or received power/energy with regard to wireless charging procedure (e.g. over time).

For instance, the display 640 may be part of the capacitance sensing structure 610 or may be disposed on the capacitance sensing structure 610.

Figure 6C:
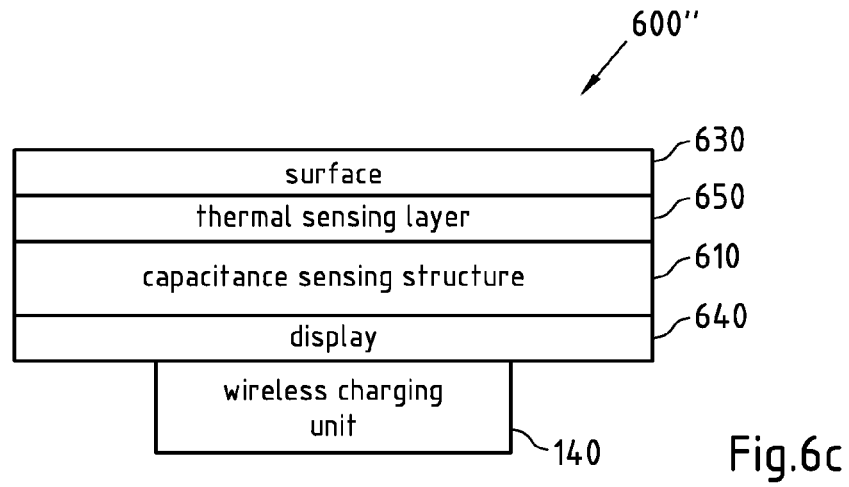

FIG. 6c depicts a cross-sectional view of a part of a fourth example embodiment of an apparatus 600" according to an aspect of the invention which is based on apparatus 600 depicted in FIG. 6a and/or based on apparatus 600' depicted in FIG. 6b.

The display 640 depicted in FIG. 6c represent an optional feature and might be omitted. Furthermore, as an example, the display 640 may be part of the capacitance sensing structure 610 or may be disposed on the capacitance sensing structure 610.

The apparatus 600' comprises a temperature sensing layer 650 disposed beneath the surface 630. As an example, the temperature sensing layer 650 might be disposed between the capacitance sensing structure 610 and the surface 630, as exemplarily depicted in FIG. 6c.

For instance, the temperature sensing layer 650 might be configured to detect thermal deviations in the surface 630, e.g. caused by local hot spots. For instance, the temperature sensing layer 650 might be configured to sense a temperature on at least one position of the temperature sensing layer 650. For instance, the temperature sensed at least one position may be used to determine than an object is detected which corresponds to the predefined type of objects if a temperature sensed at least one position of the at least one sensing position of the temperature sensing layer 650 exceeds a predefined temperature threshold.

Figures 7A, 7B:
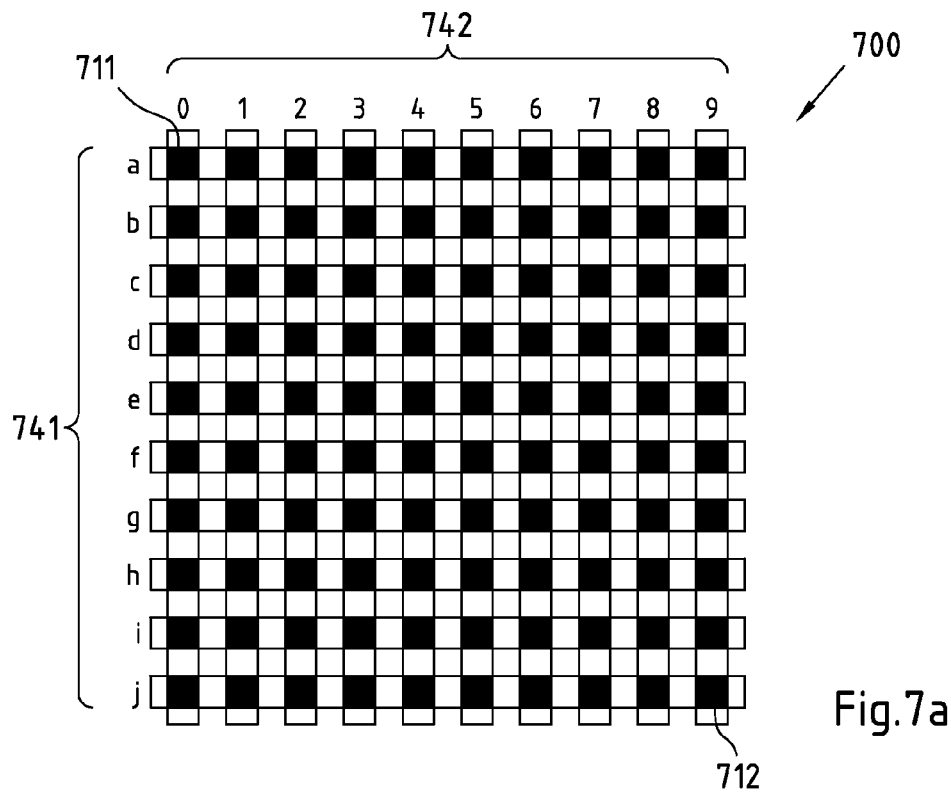
FIG. 7*a*: a second example embodiment of capacitance sensing structure.
FIG. 7*b*: an example embodiment of a read-out pattern of the second example embodiment of capacitance sensing structure.

FIG. 7a depicts a second example embodiment of capacitance sensing structure 700 which comprises a plurality of capacitance sensing elements 711, 712 (only two capacitance sensing elements 711, 712 of the plurality of capacitance sensing elements 711, 712 are labelled by a reference sign in FIG. 7a). For instance, this capacitance sensing structure 700 may be used for the capacitance sensing structure 110 depicted in FIG. 1 or for the capacitance sensing structure 410 depicted in FIGS. 4a, 4b, 6a, 6b and 6c.

The capacitance sensing structure 700 depicted in FIG. 7a comprises a plurality of rows 741 (denoted as a, b, . . . , k) and a plurality of columns 742 (denoted as 0, 1, 2, . . . , 9), where each cross section between a row and a column build a capacitor, as indicated by the black marked sections in FIG. 7a, wherein two of the plurality of capacitors are marked by reference signs 711 and 712, wherein each capacitor is formed by a respective cross sectional part of a column and a row, wherein a dielectric medium is placed between the respective cross sectional part of a column and a row. For instance, the columns 741 and rows 742 may comprise Indium Tin Oxide (ITO) and may for instance be made completely of ITO.

FIG. 7b depicts an example embodiment of a read-out pattern 700 of the second example embodiment of capacitance sensing structure 700 depicted in FIG. 7a. The read-out pattern may comprise a plurality of capacitance representatives a0, a1, . . . , 19 sensed by the plurality of capacitance sensing elements of the capacitance sensing structure 700, wherein a capacitance representative associated with a respective row and a respective column is sensed by the capacitor of this respective row and respective column.

It has to be understood that the number of rows and columns in FIGS. 7a and 7b represent an example and may differ from this example.

Furthermore, each capacitor or at least one capacitor of the plurality of capacitors of the capacitance sensing structure 700 might be configured to change its capacitance when touched. As an example, the capacitance sensing structure 700 may represent an ITO touch sensitive grid.

FIG. 8 depicts a flowchart 800 of an example embodiment of a method 800 according to a second aspect of the invention. For instance, this second aspect may be considered to represent a separate aspect of the invention, but, as an example, this second aspect may be considered to be based on comprise the features of the aspect of the invention described with respect to FIGS. 1, 2, to 7b.

For instance, any of the apparatuses 100, 400, 600, 600', 600" may be used for performing the method 800 depicted in FIG. 8, wherein the detection unit 150 depicted in FIG. 1 for instance might not comprise method step 220 depicted in FIG. 2 and/or method step 520 depicted in FIG. 5. Accordingly, all explanation presented with respect to apparatus 100, 400, 600, 600' and 600" may also hold for the apparatus for performing method 800, wherein the explanations given with respect to step 220 and step 520 might for instance not hold since steps 220 and 520 might not be necessarily implemented by method 800, but, as an example, the might be optionally implemented by method 800.

In a step 810, an object is detected based on at least one capacitance representative of at least one capacitance representative sensed by at least one capacitance sensing element 111, 112, 113 of the apparatus 100. For instance, said object detection may comprise step 210 depicted in FIG. 2 for sensing at least one capacitance representative, as explained with respect to apparatus 100 depicted in FIG. 1 and with respect to method 200 depicted in FIG. 2. The at least one sensing element 111, 112, 113 might for instance realized by any of the sensing structures 110, 410 and 710.

Then, in a step 820, it is determined whether this detected object may be associated with a predefined type of objects. For instance, said predefined type of objects may represent the predefined type of objects used in step 220, wherein this predefined type of object might be associated with at least one foreign object, as mentioned above.

For instance, this determining whether this detected object may be associated with a predefined type of objects might be performed based on training data, i.e., a known object may be placed in the predefined region in which the object can be sensed based on at least one capacitance sensing element of the at least one capacitance sensing element, and when the object is detected in step 810, it is decided in step 820 that his detected object shall be associated with the predefined type of object.

Or, as another example, the detected object might be presented to a user via an interface, e.g., a captured image of the detected object might be presented to a user via a display (e.g., display 640) or a feature of an object determined based on step 510 might be presented to a user via display (e.g., display 640), and the user may decide whether this detected object shall be associated with the predefined type of objects or not by means of a user interaction. Thus, step 820 may comprise evaluating a user interaction which might be received via an interface, e.g., the capacitance sensing structure 410 or 610 when implemented as touch sensitive capacitance sensing structure, being indicative whether the detected object shall be associated with the predefined type of objects or not.

If it is determined in step 820 that the detected object shall be associated with a predefined type of objects, in step 830 the detected object is associated with the predefined type of objects. Accordingly, the method 800 is configured to train and to learn new objects which can be detected based on the at least one capacitance sensing element 111, 112, 113 and which can be associated with the predefined type of objects if the detected object shall be associated with the predefined type of objects. Thus, for instance, a plurality of foreign objects may be associated with the predefined type of object based on method 800.

This associating a detected object with the predefined type of objects may be performed in a way that in step 220 of method 200 depicted in FIG. 1 it is possible to determine whether a detected object matches with an object associated with the predefined type of objects in step 830. For instance, step 830 may comprise determining a matching rule for the object detected in step 810, wherein this matching rule is associated with the object detected in step 810, wherein the matching rule is configured to be used in step 220 to determine whether a detected object corresponds to the object associated with the matching rule (and associated with the predefined list of objects).

This matching rule may represent any of the matching rules mentioned above and it may be derived based on at least one capacitance representative of the at least one capacitance representative sensed when the object is detected in step 810.

For instance, said matching rule may comprise at least one predefined capacitance value and/or at least one predefined change of a capacitance value, wherein each of this at least one predefined capacitance value and/or at least one predefined change of a capacitance value is associated with a different capacitance sensing element 111, 112, 113 of the at least one capacitance sensing element 111, 112, 113. Or, as another example, said matching rule might comprise at least one predefined range of capacitance values and/or at least one predefined range of changes of a capacitance value, wherein each of this at least one predefined range of capacitance values and/or at least one predefined range of changes of a capacitance value is associated with a different capacitance sensing element 111, 112, 113 of the at least one capacitance sensing element 111, 112, 113.

As an example, if determining whether a detected object corresponds to the predefined type of objects in step 220 of FIG. 2 is based on a comparison whether an image captured based on at least one capacitance representative of at least one capacitance sensor 111, 112, 113 at least partially matches with an image of an object associated with the predefined type of objects, the capacitance sensing structure may comprise a plurality of capacitance sensing elements, and method 800 may comprise capturing an image based on at least one capacitance representative sensed by at least one capacitance sensing element of the plurality of capacitance sensing elements, and associating the captured image or at least a part of the captured image as a reference image of this object with the predefined type of objects. Thus, as an example, the matching rule associated with the detected object may comprise this reference image. Thus, for instance, step 830 may comprise obtaining a subpart of the complete image captured by at least one capacitance sensing element.

Or, as another example, if determining whether a detected object corresponds to the predefined type of objects in step 220 of FIG. 2 is performed on method 500 depicted in FIG. 5, i.e., based on determining a feature of an object based on at least one capacitance representative (step 510), and based on determining whether the determined feature at least partially corresponds to a predefined feature associated with the predefined type of objects (step 520), method 800 may comprise determining a feature of an object based on at least one capacitance representative as explained with respect to step 510 of method 500 depicted in FIG. 5, and step 830 may comprise associating a representative of this determined feature of this object with the predefined type of objects, e.g. by associating this representative of the determined feature as predefined feature in the list comprising at least one predefined feature. Accordingly, the explanations given with respect to method 500 may also hold for method 800 depicted in FIG. 8. Thus, as an example, the matching rule associated with the detected object may comprise this predefined feature.

For instance, if the feature represents a shape of the object, this shape may be determined by method 800 based on an edge detection which may be performed in a subpart of the captured image or the complete captured image as explained with respect to method 500 depicted in FIG. 5. Then, as an example, step 830 may comprise associating a representative of the determined shape of this object with the predefined type of objects, e.g. by associating this representative of the determined shape as predefined feature in the list comprising at least one predefined feature. Accordingly, the explanations given with respect to method 500 for determining a shape of an object may also hold for method 800 depicted in FIG. 8. Thus, as an example, the matching rule associated with the detected object may comprise this representative of the shape as predefined feature.

For instance, said detected shape may represent a new image comprising shape information, which might for instance be generated based on said edge detection, wherein this new image might be compared with a predefined image associated with the predefined type of objects. Thus, for instance, with respect to the above mentioned list comprising at least one predefined feature associated with the predefined type of objects, this list might comprise at least one predefined image comprising shape information as representative of the determined shape, wherein each predefined image may be associated with a respective predefined object.

As an example, the edge detection algorithm for determining the shape may be based or may represent one of: a Sobel-Operator, a Scharr-Operator, a Laplace-Filter, a Prewitt-Operator, a Roberts-Operator, a Kirsch-Operator, a Canny-Algorithmus, and Marr-Hildreth-Operator.

Furthermore, for instance, said determined shape may represent the type of the shape, e.g. circular, quadratic, elliptic, rectangular and/or any other well-suited shape, and, for instance, the determined shape may further comprise information on the size of the shape. Then, as an example, with respect to the above mentioned list comprising at least one predefined feature associated with the predefined type of objects, this list might comprise at least one type of shape as representative of the determined shape, wherein each type of shape is associated with a respective predefined object.

Accordingly, method 800 enables to train the recognition of objects which might be performed based on training objects and/or user interaction. For instance, this information obtained by training enables a better determining whether a detected object is associated with the predefined type of objects.

Figure 9:
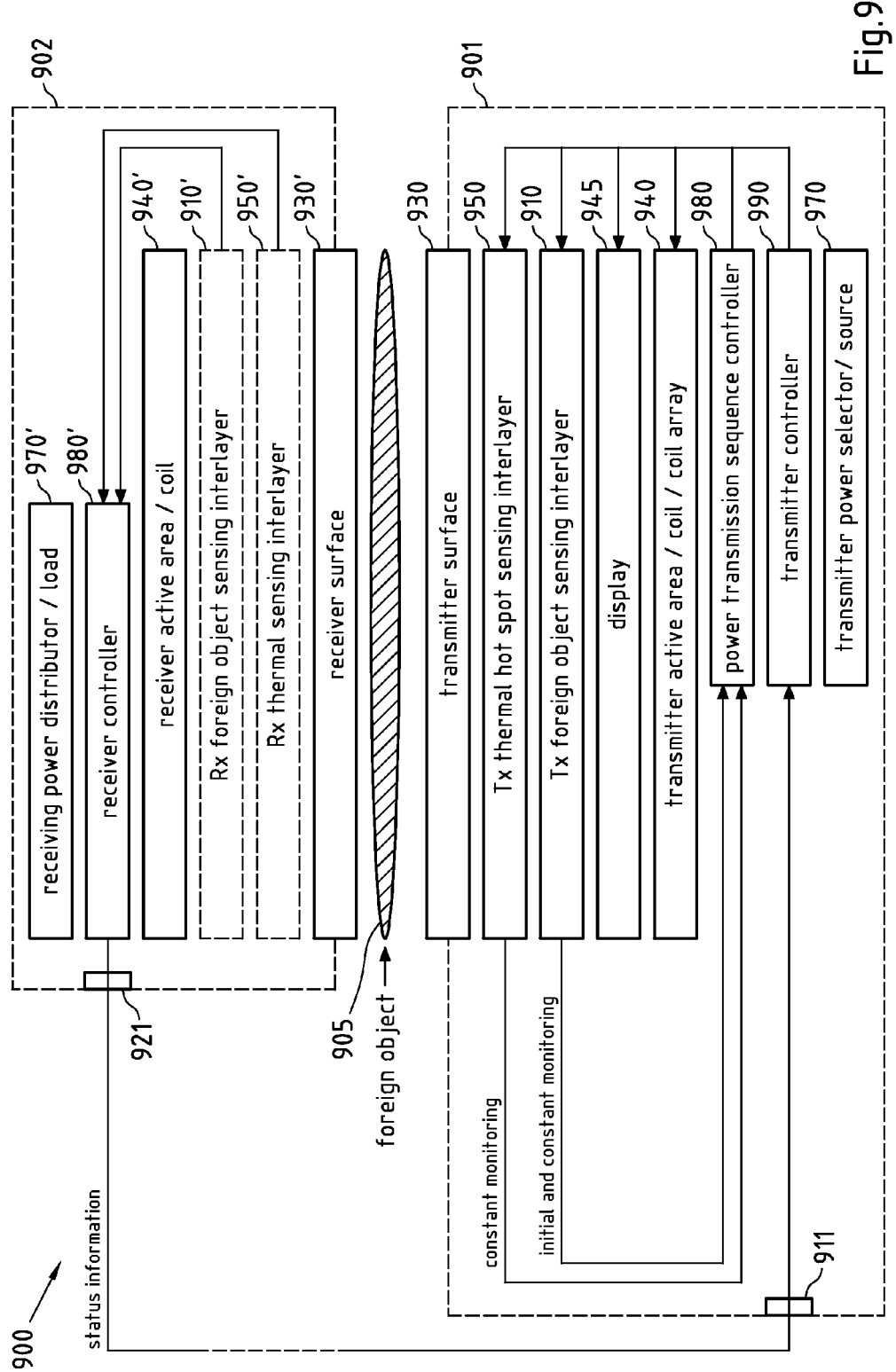
FIG. 9: a cross-sectional view of a part of a fifth example embodiment of an apparatus of an example of a system according to an aspect of the invention.

FIG. 9 depicts a cross-sectional view of a part of a fifth example embodiment of a first apparatus 901 of an example of a system 900 according to an aspect of the invention, wherein this system comprises a second apparatus 902.

This first apparatus 901 may represent or may be based on any of the apparatuses 100 and 400 explained above and comprises the part of the fourth example embodiment of an apparatus 600" depicted in FIG. 6c, i.e., a display 945 disposed on a transmitter active area/coil/coil array 940, wherein the display 940 of apparatus 901 corresponds to display 640 of apparatus 600" and the transmitter active area/coil/coil array 940 of apparatus 901 corresponds to an example of the wireless charging unit 140 of apparatus 600", and wherein the wireless charging unit 140 comprises at least one transmitting coil configured to provide electromagnetic energy via an electromagnetic field generated by said at least one transmitting coil. Thus, the first apparatus 901 may be considered to represent or to be a part of a wireless charger.

For instance, the term "disposed on" might be understood in a way that a first element which is disposed on a different second element is disposed in a direction towards an outer surface of the apparatus, e.g. in direction to the transmitter surface 930 depicted in FIG. 9. This definition may for instance hold for the complete specification, in particular with respect to FIGS. 6a, 6b and 6c.

Furthermore, first apparatus 901 comprises a foreign object sensing interlayer 910 disposed on the display 945 (and thus also disposed on the transmitter active/area/coil/coil array 940), wherein this foreign object sensing layer 910 corresponds to the capacitance sensing structure 640 of apparatus 600" depicted in FIG. 6c. A thermal hot spot sensing interlayer 950 is disposed on the foreign object sensing layer 910, wherein this foreign object sensing layer 950 corresponds to the thermal sensing layer 650 of apparatus 600" depicted in FIG. 6c. A transmitter surface 930 is disposed on the thermal hot spot sensing interlayer 910, wherein the transmitter surface 930 corresponds to the transmitter surface of apparatus 600" depicted in FIG. 6c.

Thus, the first apparatus 901 comprises the arrangement of wireless charging unit 140, display 640, capacitance sensing structure 610, thermal sensing layer 650 and surface 630 of apparatus 600" depicted in FIG. 6c.

Furthermore, the first apparatus 901 comprises a power transmission sequence controller 980 and a transmitter controller 990, wherein these controllers 980 and 990 are configured to control the transmitter active area/coil/coil array 940, the foreign object sensing interlayer 910 and the thermal hot spot sensing interlayer 950. As an example, controllers 980 and 990 may be combined in a single controller, wherein this single controller might represent the detection unit 150 of apparatus 100 depicted in FIG. 1. A transmitter power selector/source might for instance be configured to provide energy at least to the transmitter active area/coil/coil array 940.

For instance, in a first mode the controllers 980, 990 are configured to deactivate the transmitter active area/coil/coil array 940 and configured to determine whether an object detected based on at least one capacitance representative of the at least one capacitance representative sensed by the foreign object sensing interlayer 940 corresponds to a predefined type of objects, as mentioned above. Furthermore, in this first mode said determining whether an detected object corresponds to a predefined type of objects may further depend on a temperature sensed by the thermal hot spot sensing interlayer 950, wherein, for instance, it may be determined that an object corresponds to the predefined type of objects if a temperature sensed on at least one position of at least one sensing position of thermal hot spot sensing interlayer 950 exceeds a predefined threshold. Thus, in this first mode the controllers 980, 990 might be configured to deactivate the transmitter active area/coil/coil array 940 and to activate the foreign object sensing interlayer 910 and the thermal hot spot sensing interlayer 950.

Furthermore, in a second mode the controllers 980, 990 are configured to activate the transmitter active area/coil/coil array 940 in order to provide wireless power for charging and configured to determine whether an detected object corresponds to a predefined type may be performed on a temperature sensed by the thermal hot spot sensing interlayer 950, wherein, for instance, the controllers 980, 990 may be configured to determine that an object corresponds to the predefined type of objects if a temperature sensed on at least one position of at least one sensing position of thermal hot spot sensing interlayer 950 exceeds a predefined threshold. In this second mode, the controllers 980, 990 may further be configured not to use the foreign object sensing interlayer 910 for detecting an object, i.e., for instance, the controllers 980, 990 might be configured to deactivate the foreign object sensing interlayer in the second mode. Thus, in this second mode the controllers 980, 990 might be configured to activate the transmitter active area/coil/coil array 940 the thermal hot spot sensing interlayer 950 and to deactivate the foreign object sensing interlayer 910. Accordingly, a foreign object 905 can be detected in the first mode before wireless charging is started.

For instance, the thermal hot spot sensing interlayer 950 may be configured to detect single or multiple hot spots, and based on the detected situation a wireless power transfer may be stopped. As an example, in the second mode there is no comparison with pre-defined shapes needed since the thermal hot spot sensing interlayer 950 would just inform about the temperature level of the surface of the transmitter stack or the receiver stack, wherein the transmitter stack may comprise the transmitter active area/coil/coil array 940, the Tx foreign object sensing interlayer 910, the Tx thermal hot spot sensing interlayer 950 and the transmitter surface, and wherein the receiver stack may comprise the receiver active area/coil 940', the Rx foreign object sensing interlayer, the Rx thermal sensing interlay 950' and the receiver surface 930'.

As an example, the thermal hot spot sensing interlayer 950 may be configured to be operated in a first state, wherein in this first state the thermal hot spot sensing interlayer 950 is configured to scan thermal shapes. Furthermore, as an example, the thermal hot spot sensing interlayer 950 may be configured to be operated in a second state, wherein in this second state the thermal hot spot sensing interlayer 950 is configured to detect single and/or multiple hot spots on the thermal hot spot sensing interlayer 950. For instance, the thermal hot spot sensing interlayer 950 may be configured to be operated in a third state, wherein in this third state the thermal hot spot sensing interlayer 950 is configured to sense overall temperature distribution. Thus, for instance, the hot spot sensing interlayer 950 may be operated in the first state, in the second state or in the third state, wherein in each state thermal information is detected, and wherein in the first state the thermal information represents thermal shape, in the second state the thermal information represents the information about detected hot spots, e.g., whether there is a single hot spot or multiple hot spots (which may include the number of detected hot spots) and may further comprise information regarding the position of the detected at least on hot spot, and wherein the third state the thermal information represents an overall temperature distribution. For instance, based on the detected thermal information, it may be decided whether to stop or not to stop wireless charging. For instance, this may be performed without a comparison whether a detected object corresponds to a pre-defined type of objects.

Furthermore, in a third mode the controllers 980, 990 are configured to activate the transmitter active area/coil/coil array 940 and to determine whether an object detected based on at least one capacitance representative of the at least one capacitance representative sensed by the foreign object sensing interlayer 940 corresponds to a predefined type of objects, and, for instance, to determine whether an detected object corresponds to a predefined type of objects may further depend on a temperature sensed by the thermal hot spot sensing interlayer 950, wherein, for instance, it may be determined that an object corresponds to the predefined type of objects if a temperature sensed on at least one position of at least one sensing position of thermal hot spot sensing interlayer 950 exceeds a predefined threshold. Thus, in this third mode the controllers 980, 990 might be configured to activate the transmitter active area/coil/coil array 940, the foreign object sensing interlayer 910 and the thermal hot spot sensing interlayer 950.

Furthermore, system 900 comprises the second apparatus 902, wherein the second apparatus 902 may be based at least partially on one of the apparatuses 100, 400 and 600". The receiver active area/coil 980' is based on the wireless charging unit 140 depicted in FIG. 1 and comprises at least one receiving coil configured to receive electromagnetic energy via an electromagnetic field, wherein this electromagnetic field might be generated by the transmitter active area/coil/coil array 940 of the first apparatus 901. For instance, a receiving power distributor/load 970' is configured to receive energy from the receiver active area/coil 940'.

A receiver surface 930' is disposed on the receiver active area coil 940'. A receiver controller 980' is configured to control the receiver active area/coil 940', and is configured to provide status information based on a status of the receiver active area/coil. For instance, if the receiver active area/coil 940' receives energy, the controller 980' might be configured to provide a status information being indicative of the status "energy is received". Or, for instance, if the receiver active area 940' receives no energy, the controller 980' might be configured to provide a status information being indicative of the status "no energy is received". For instance, the second apparatus 902 might comprise an interface 921 being configured to provide the status information to a further apparatus, e.g. a wireless charger.

For instance, the first apparatus 901 might comprise an optional interface 911 being configured to receive the status information provided by interface 921 of the second apparatus 902. Accordingly, as an example, the transmitter controller 980 of the first apparatus 901 might be configured to adapt the wireless charging process based on the received status information.

As an example, interfaces 921 and 911 might comply with a transmission in accordance with the Wireless Power Consortium, but, for instance, any other well-suited transmission scheme may be used.

Furthermore, as an example, the receiver active area/coil 940 might also be configured to provide electromagnetic energy via an electromagnetic field, wherein, for instance, the at least one receiving coil might be used as at least one transmitter coil or wherein at least one additional transmitter coil may be used. Then, as an example, apparatus 902 might comprise a foreign object sensing interlayer 910' disposed on the receiver active area/coil 940' and a thermal sensing interlayer 950' disposed on the foreign object sensing interlayer, similar to the arrangement of the thermal hot spot sensing interlayer 950 and the foreign object sensing interlayer 940 of the first apparatus. Furthermore, the second apparatus 902 may comprise a controller configured to performed the functionality of the power transmission sequence controller 980 and/or the transmitter controller 990 of the first apparatus 901, e.g., in order to determine whether a detected object corresponds to a predefined type of object as explained with respect to the first apparatus, and, for instance, in order to perform the first mode, the second mode and the third mode explained with respect to the first apparatus 901.

For instance, the power transmission sequence controller 980 and/or the transmitter controller 990 might be configured to operate the apparatus in the first mode, the second mode or in the third mode depending on the situation and/or on information of the wireless energy transfer process associated with the transmitter active are/coil/coil array 940. Furthermore, it has to be understood that the apparatus it not limited to be operated in either of the first, second and third mode, but there may for instance be further modes for operating the apparatus.

Furthermore, as an example, the actual mode of operation might be shown on the display 945.

As used in this application, the term 'circuitry' refers to all of the following:
(a) hardware-only circuit implementations (such as implementations in only analog and/or digital circuitry) and
(b) combinations of circuits and software (and/or firmware), such as (as applicable):
(i) to a combination of processor(s) or
(ii) to portions of processor(s)/software (including digital signal processor(s)), software, and memory(ies) that work together to cause an apparatus, such as a mobile phone or a positioning device, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a positioning device.

With respect to the aspects of the invention and their embodiments described in this application, it is understood that a disclosure of any action or step shall be understood as a disclosure of a corresponding (functional) configuration of a corresponding apparatus (for instance a configuration of the computer program code and/or the processor and/or some other means of the corresponding apparatus), of a corresponding computer program code defined to cause such an action or step when executed and/or of a corresponding (functional) configuration of a system (or parts thereof).

The aspects of the invention and their embodiments presented in this application and also their single features shall also be understood to be disclosed in all possible combinations with each other. It should also be understood that the sequence of method steps in the flowcharts presented above is not mandatory, also alternative sequences may be possible.

The invention has been described above by non-limiting examples. In particular, it should be noted that there are alternative ways and variations which are obvious to a skilled person in the art and can be implemented without deviating from the scope and spirit of the appended claims. In particular, it should be noted that the at least one capacitance sensing element may be arranged in other arrangements than presented in the example embodiments. For instance, columns and rows of a capacitance sensing structure may be arranged at least partially irregularly.

The invention claimed is:

1. A method performed by an apparatus, comprising:
   determining whether an object detected based on at least one capacitance, representative of at least one capacitance representative sensed by at least one capacitance sensing element of said apparatus, corresponds to a predefined type of objects,
   wherein the apparatus further comprises a wireless charging unit, and
   wherein the at least one capacitance sensing element is at least partially placed in proximity to the wireless charging unit,
   wherein said at least one capacitance sensing element represents a plurality of capacitance sensing elements,
   wherein the apparatus further comprises a touch sensitive interface and the plurality of capacitance sensing elements is part of the touch sensitive interface,
   wherein said touch sensitive interface comprises a display, and
   wherein the determining whether the object detected corresponds to the predefined type of objects is performed based on training data in which the display is used in performing a training procedure to learn predefined objects being associated with the predefined type of objects.

2. The method according to claim 1, further comprising:
   capturing an image of the object detected based on at least one capacitance representative, sensed by at least one capacitance sensing element of the plurality of capacitance sensing elements, and
   wherein said determining whether an object detected based on at least one sensed capacitance of said at least one sensed capacitance corresponds to a predefined type of object comprises:
   determining whether the captured image of the object detected at least partially matches with an image of an object associated with the predefined type of objects.

3. The method according to claim 1, wherein said determining whether an object detected based on at least one sensed capacitance of said at least one sensed capacitance corresponds to a predefined type of object comprises:
   determining a feature of the object based on at least one sensed capacitance representative, and
   determining whether the feature at least partially corresponds to a predefined feature of at least one predefined feature associated with said predefined type of objects,
   wherein said feature represents a shape of the object, and wherein the determining whether the feature at least partially corresponds to a predefined feature comprises comparing information on a size and the shape of the object detected with a size associated with a respective predefined object, and, when the size of the object detected is less than a size threshold, it is determined that the object detected does not match with the respective predefined object, even if a type of shape of the object detected at least partially corresponds to the type of shape associated with this predefined object.

4. The method according to claim 3, wherein said shape of the object is determined based on an edge detection.

5. The method according to claim 1, wherein the apparatus comprises at least one temperature sensor, and wherein said determining whether an object corresponds to the predefined type of objects is further based on a temperature measured by said at least one temperature sensor.

6. A non-transitory computer-readable storage medium carrying one or more sequences of one or more instructions which, when executed by one or more processors, cause an apparatus to:
   determine whether an object detected based on at least one capacitance, representative of at least one capacitance representative sensed by at least one capacitance sensing element of said apparatus, corresponds to a predefined type of objects,
   wherein the apparatus further comprises a wireless charging unit, and
   wherein the at least one capacitance sensing element is at least partially placed in proximity to the wireless charging unit,
   wherein said at least one capacitance sensing element represents a plurality of capacitance sensing elements,
   wherein the apparatus further comprises a touch sensitive interface and the plurality of capacitance sensing elements is part of the touch sensitive interface,
   wherein said touch sensitive interface comprises a display, and
   wherein determining whether the object detected corresponds to the predefined type of objects is performed based on training data in which the display is used in performing a training procedure to learn predefined objects being associated with the predefined type of objects.

7. An apparatus, comprising:
   a wireless charging unit;
   at least one capacitance sensing element at least partially placed in proximity to the wireless charging unit, wherein each capacitance sensing element is configured to sense a capacitance representative; and
   a detection unit configured to determine whether an object detected based on at least one capacitance representative sensed by at least one capacitance sensing element of said at least one capacitance sensing element corresponds to a predefined type of objects,
   wherein said at least one capacitance sensing element represents a plurality of capacitance sensing elements,
   wherein the apparatus further comprises a touch sensitive interface and the plurality of capacitance sensing elements is part of the touch sensitive interface,
   wherein said touch sensitive interface comprises a display, and
   wherein determining whether the object detected corresponds to the predefined type of objects is performed based on training data in which the display is used in performing a training procedure to learn predefined objects being associated with the predefined type of objects.

8. The apparatus according to claim 7, wherein the detection unit is configured to capture an image based on at least one capacitance representative, sensed by at least one capacitance sensing element of the plurality of capacitance sensing elements, and wherein said determining whether an object detected based on at least one sensed capacitance of said at least one sensed capacitance corresponds to a predefined type of object comprises:
   determining whether the captured image at least partially matches with an image of an object associated with the predefined type of objects.

9. The apparatus according to claim 7, wherein said determining whether an object detected based on at least one sensed capacitance of said at least one sensed capacitance corresponds to a predefined type of object comprises:
   determining a feature of the object based on at least one sensed capacitance representative, and
   determining whether the feature at least partially corresponds to a predefined feature of at least one predefined feature associated with said predefined type of objects, wherein said feature represents a shape of the object, and
   wherein the determining whether the feature at least partially corresponds to a predefined feature comprises comparing information on a size and the shape of the object detected with a size associated with a respective predefined object, and, when the size of the object detected is less than a size threshold, it is determined that the object detected does not match with the respective predefined object, even if a type of shape of the object detected at least partially corresponds to the type of shape associated with this predefined object.

10. The apparatus according to claim 7, wherein said determining whether an object detected based on at least one sensed capacitance of said at least one sensed capacitance corresponds to a predefined type of object comprises:
   determining a feature of the object based on at least one sensed capacitance representative, and
   determining whether the feature at least partially corresponds to a predefined feature of at least one predefined feature associated with said predefined type of objects, wherein said feature represents a shape of the object, and
   wherein said determining whether the shape at least partially corresponds to a predefined shape associated with said predefined type of object comprises:
   calculating for at least one predefined feature of the at least one predefined feature associated with said predefined type of object a correlation value being indicative of a correlation between the respective predefined feature and the determined feature, and
   determining whether a correlation value exceeds a predefined correlation value.

11. A method performed by an apparatus, comprising:
   detecting an object based on at least one sensed capacitance, representative of the at least one capacitance representative sensed by at least one capacitance sensing element of said apparatus, the apparatus further comprising a wireless charging unit, wherein the at least one capacitance sensing element is placed at least partially in proximity to the wireless charging unit;
   verifying whether the detected object shall be associated with a predefined type of objects; and
   if said detected object shall be associated with the predefined type of object, associating the detected object with the predefined type of objects, wherein said at least one capacitance sensing element represents a plurality of capacitance sensing elements, wherein the apparatus further comprises a touch sensitive interface and the plurality of capacitance sensing elements is part of the touch sensitive interface, wherein said touch sensitive interface comprises a display, and wherein verifying whether the detected object shall be associated with the predefined type of objects is performed based on training data in which the display is used in performing a training procedure to learn predefined objects being associated with the predefined type of objects.

12. The method according to claim 11, wherein said verifying is further performed based on:
   user interaction for indicating whether a detected object shall be associated with the predefined type of objects.

13. A computer-readable storage medium carrying one or more sequences of one or more instructions which, when executed by one or more processors, cause an apparatus to:
   detect an object based on at least one sensed capacitance, representative of the at least one capacitance representative sensed by at least one capacitance sensing element of said apparatus, the apparatus further comprising a wireless charging unit,
   wherein the at least one capacitance sensing element is placed at least partially in proximity to the wireless charging unit to verify whether the detected object shall be associated with a predefined type of objects, and, if said detected object shall be associated with the predefined type of object, to associate the detected object with the predefined type of objects,
   wherein said at least one capacitance sensing element represents a plurality of capacitance sensing elements,
   wherein the apparatus further comprises a touch sensitive interface and the plurality of capacitance sensing elements is part of the touch sensitive interface, wherein said touch sensitive interface comprises a display, and wherein verifying whether the detected object shall be associated with the predefined type of objects is performed based on training data in which the display is used in performing a training procedure to learn predefined objects being associated with the predefined type of objects.

14. An apparatus, comprising:
   a wireless charging unit;
   at least one capacitance sensing element at least partially placed in proximity to the wireless charging unit, wherein each capacitance sensing element is configured to sense a capacitance representative;
   a detection unit configured to detect an object based on at least one sensed capacitance, representative of the at least one capacitance representative sensed by the at least one capacitance sensing element of said apparatus, to verify whether the detected object shall be associated with a predefined type of objects, and, if said detected object shall be associated with the predefined type of object, to associate the detected object with the predefined type of objects,
   wherein said at least one capacitance sensing element represents a plurality of capacitance sensing elements,
   wherein the apparatus further comprises a touch sensitive interface and the plurality of capacitance sensing elements is part of the touch sensitive interface,
   wherein said touch sensitive interface comprises a display, and
   wherein verifying whether the detected object shall be associated with the predefined type of objects is performed based on training data in which the display is used in performing a training procedure to learn predefined objects being associated with the predefined type of objects.

* * * * *